United States Patent
Suzuki et al.

(10) Patent No.: US 9,880,498 B2
(45) Date of Patent: Jan. 30, 2018

(54) HEATER CONTROL DEVICE AND IMAGE FORMATION APPARATUS

(71) Applicant: Oki Data Corporation, Tokyo (JP)

(72) Inventors: Shuichi Suzuki, Tokyo (JP); Toru Kosaka, Tokyo (JP)

(73) Assignee: Oki Data Corporation, Tokyo (JP)

(*) Notice: Subject to any disclaimer, the term of this patent is extended or adjusted under 35 U.S.C. 154(b) by 0 days.

(21) Appl. No.: 15/355,095

(22) Filed: Nov. 18, 2016

(65) Prior Publication Data

US 2017/0153585 A1 Jun. 1, 2017

(30) Foreign Application Priority Data

Nov. 30, 2015 (JP) .................................. 2015-232937

(51) Int. Cl.
| | |
|---|---|
| G03G 15/20 | (2006.01) |
| G03G 15/00 | (2006.01) |
| H02M 1/42 | (2007.01) |
| H02M 7/44 | (2006.01) |
| H05B 1/02 | (2006.01) |

(52) U.S. Cl.
CPC ......... *G03G 15/2039* (2013.01); *G03G 15/80* (2013.01); *H02M 1/4208* (2013.01); *H02M 7/44* (2013.01); *H05B 1/0202* (2013.01); *H05B 1/0241* (2013.01)

(58) Field of Classification Search
CPC . G03G 15/2039; G03G 15/80; H02M 1/4208; H02M 7/44; H05B 1/0202; H05B 1/0241
See application file for complete search history.

(56) References Cited

U.S. PATENT DOCUMENTS

| | | | | |
|---|---|---|---|---|
| 9,471,014 | B2* | 10/2016 | Suzuki | G03G 15/2039 |
| 9,740,158 | B2* | 8/2017 | Kosaka | G03G 15/80 |
| 9,746,812 | B2* | 8/2017 | Kosaka | G03G 15/80 |
| 2016/0139548 | A1* | 5/2016 | Kosaka | G03G 15/2039 399/67 |
| 2016/0216662 | A1* | 7/2016 | Kosaka | G03G 15/2039 |
| 2016/0342128 | A1* | 11/2016 | Yamamoto | H02J 7/34 |

FOREIGN PATENT DOCUMENTS

JP  2013-235107 A  11/2013

* cited by examiner

*Primary Examiner* — Rodney Bonnette
(74) *Attorney, Agent, or Firm* — Metrolexis Law Group, PLLC

(57) ABSTRACT

An image formation apparatus includes: one or more image formation units; one or more heaters; a first voltage converter which generates a direct first voltage based on an alternating external input voltage inputted from outside of the first voltage converter; a second voltage converter which generates an alternating second voltage based on the first voltage, the second voltage supplying alternating-current power to the one more heaters; a third voltage converter which generates a third voltage based on the first voltage, the third voltage being used to drive at least the one or more heaters; a controller which performs an operation control of reducing power consumption in at least the one or more heaters when the external input voltage decreases to a range of a first threshold or lower and higher than a second threshold and/or when a load change of the first voltage converter is lower than a third threshold.

20 Claims, 13 Drawing Sheets

HEATER CONTROL DEVICE AND IMAGE FORMATION APPARATUS

CROSS REFERENCE TO RELATED APPLICATIONS

This application claims priority based on 35 USC 119 from prior Japanese Patent Application No. 2015-232937 filed on Nov. 30, 2015, entitled "HEATER CONTROL DEVICE AND IMAGE FORMATION APPARATUS", the entire contents of which are incorporated herein by reference.

BACKGROUND OF THE INVENTION

1. Field of the Invention

The present disclosure relates to a heater control device adapted to heat a medium, and an image formation apparatus.

2. Description of Related Art

In an image formation apparatus using an electrophotographic method, an image formation unit forms (transfers) a toner image on a medium such as a sheet and a fuse device (fuser) fuses the toner image to the medium (see, for example, Japanese Patent Application Publication No. 2013-235107). Image formation using the electrophotographic method is thus performed.

Some members of the image formation apparatus such as the fuser utilize a heating operation by the use of heaters (heating members, heating bodies). An electrolytic capacitor is generally provided in a control device for such heaters.

SUMMARY OF THE INVENTION

Since there is a demand for the reduction of power consumption in the heater control device and the image formation apparatus, a proposal for a method of reducing power consumption is desired.

In one aspect of the invention, an object is to provide a heater control device capable of reducing power consumption and an image formation apparatus including such a heater control device.

A first aspect of the invention is a heater control device that includes: a first voltage converter which generates a direct first voltage based on an alternating external input voltage inputted from outside of the first voltage converter; a second voltage converter which generates an alternating second voltage based on the first voltage, alternating-current power based on the second voltage being supplied to one or a plurality of heaters in an apparatus; a third voltage converter which generates a third voltage based on the first voltage, at least the one or a plurality of heaters are driven based on the third voltage; and a controller which performs an operation control of reducing power consumption in at least the one or plurality of heaters in at least one of a case where the external input voltage decreases to a range of a first threshold or lower and higher than a second threshold and a case where a load change of the first voltage converter is lower than a third threshold.

A second aspect of the invention is an image formation apparatus that includes: one or a plurality of image formation units; one or a plurality of heaters; a first voltage converter which generates a direct first voltage based on an alternating external input voltage inputted from outside of the first voltage converter; a second voltage converter which generates an alternating second voltage based on the first voltage, alternating-current power based on the second voltage being supplied to the one or plurality of heaters; a third voltage converter which generates a third voltage based on the first voltage, at least the one or a plurality of heaters are driven based on the third voltage; a controller which performs an operation control of reducing power consumption in at least the one or plurality of heaters in at least one of a case where the external input voltage decreases to a range of a first threshold or lower and higher than a second threshold and a case where a load change of the first voltage converter is lower than a third threshold.

According to the aspects of the invention, it is possible to reduce the power consumption of the heater control device and the image formation apparatus.

DETAILED DESCRIPTION OF EMBODIMENTS

Figure 1:
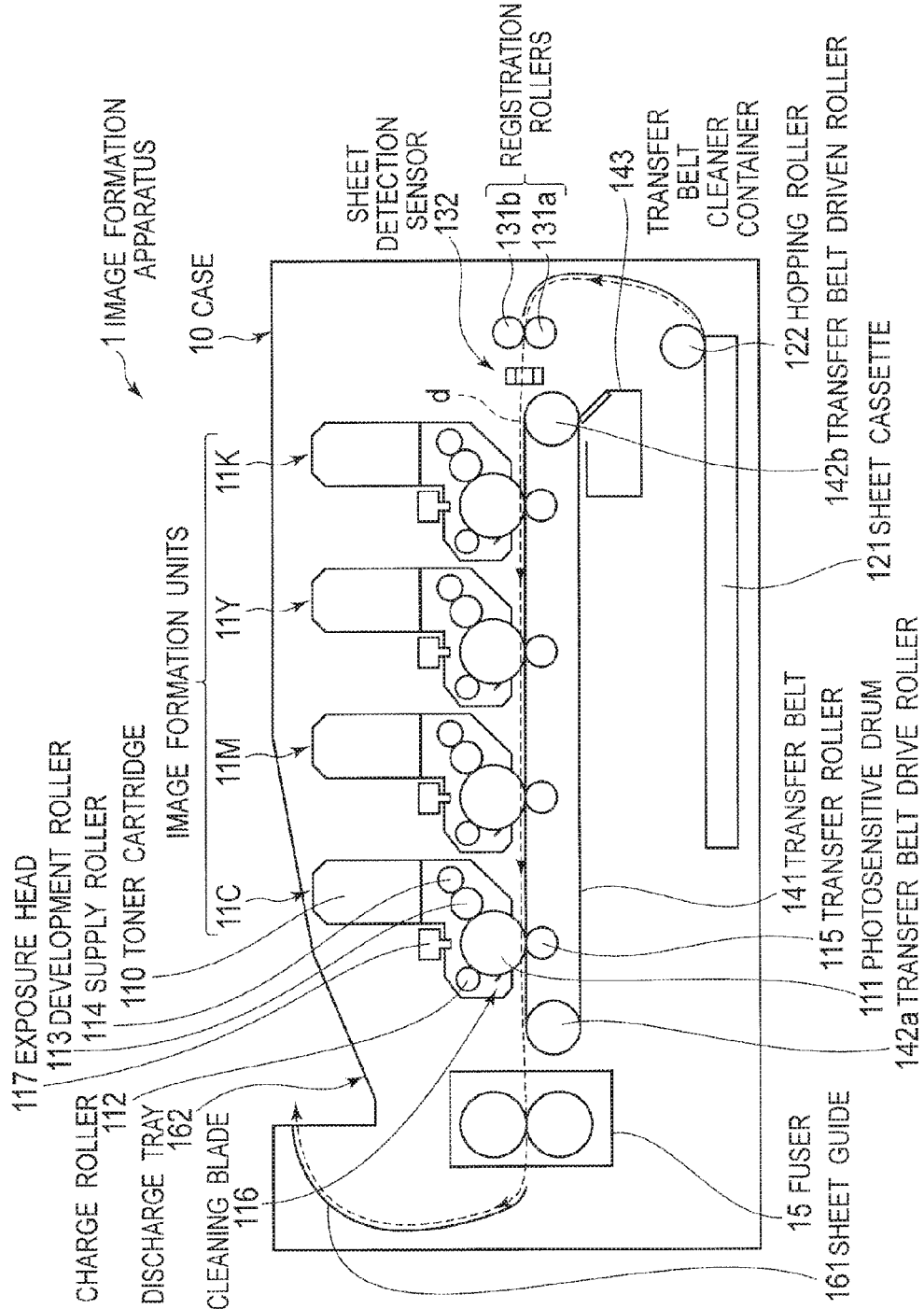
FIG. 1 is a schematic diagram illustrating an example of an overall configuration of an image formation apparatus of an embodiment of the invention.

Descriptions are provided hereinbelow for embodiments based on the drawings. In the respective drawings referenced herein, the same constituents are designated by the same reference numerals and duplicate explanation concerning the same constituents is omitted. All of the drawings are provided to illustrate the respective examples only.

An embodiment of the invention is described below in detail with reference to the drawings. Note that the description is given in the following order: 1. Embodiment (an example in which the control of reducing power consumption is performed by using a detection of the output voltage); 2. Modified Example, Modified Example 1 (an example in which the control of reducing the power consumption is performed by using the detection of a total output current) and Modified Example (an example in which the control of reducing the power consumption is performed by using the detection of an individual output current); and 3. Other Modified Examples.

1. Embodiment

[Schematic Configuration]

FIG. 1 is a view schematically illustrating an example of an overall configuration of an image formation apparatus (image formation apparatus 1) in an embodiment of the invention. Image formation apparatus 1 functions as a printer (color printer in this example) which forms an image (color image in this example) on a recording medium which is, for example, a plain paper sheet or the like by using an electrophotographic method.

As illustrated in FIG. 1, image formation apparatus 1 includes four image formation units 11C, 11M, 11Y, and 11K, sheet cassette (sheet feed tray) 121, hopping roller (supply roller) 122, registration rollers (conveyance rollers) 131a and 131b, and sheet detection sensor 132. Image formation apparatus 1 also includes transfer belt 141, transfer belt drive roller 142a, transfer belt driven roller 142b, transfer belt cleaner container 143, fuser (fuse device) 15, sheet guide 161, and discharge tray 162. Note that, as illustrated in FIG. 1, these members are housed in predetermined case 10 including an upper cover which can be opened and closed (not illustrated) and the like. Moreover, each of image formation units 11C, 11M, 11Y, and 11K are integrally formed and detachably installed in image formation apparatus 1.

Sheet cassette 121 is a member for storing the recording media in a stacked state, and is detachably installed in a lower portion of image formation apparatus 1.

Hopping roller 122 is a member (sheet feed mechanism) which separately picks up the recording media stored in sheet cassette 121 one by one from a top portion of the stacked recording media and feeds out each recording medium toward registration rollers 131a and 131b.

Registration rollers 131a and 131b are members which convey the recording medium fed out from hopping roller 122 toward transfer belt 141 by holding the recording medium therebetween and which correct any skewing of the recording medium in the conveyance.

Sheet detection sensor 132 is a sensor which detects the passing of the recording medium (sheet) conveyed from registration rollers 131a and 131b by means of a contact detection or of a non-contact detection.

(Image Formation Units 11C, 11M, 11Y, and 11K)

As illustrated in FIG. 1, image formation units 11C, 11M, 11Y, and 11K are arranged side by side along the conveyance direction (conveyance route) d of the recording medium. Specifically, the image formation units are arranged in the order of image formation units 11K, 11Y, 11M, and 11C along conveyance direction d (from an upstream side to a downstream side). Note that, as illustrated in FIG. 1, conveyance route d is an S-shaped route as a whole in this example.

Image formation units 11C, 11M, 11Y, and 11K form images (toner images) on the recording medium by using toners (developers) of different colors. Specifically, image formation unit 11C forms a cyan toner image by using a cyan (C) toner, and image formation unit 11M. forms a magenta toner image by using a magenta (M) toner. Similarly, image formation unit 11Y forms a yellow toner image by using a yellow (Y) toner, and image formation unit 11K forms a black toner image by using a black (K) toner.

The toners of such colors each contain, for example, a predetermined colorant, mold release agent, charge control agent, treatment agent, and the like. The toners are produced by appropriately mixing these contents or by performing a surface treatment on these contents. Out of these contents, the colorant, the mold release agent, and the charge control agent function as internal additives. For example, silica, titanium oxide, and the like are used as external additives and, for example, a polyester resin and the like are used as binder resins.

Moreover, dye, pigment, or the like or a combination of multiple types of dye, pigment, and the like can be used as the colorant. Specifically, as the colorant, it is possible to use, for example, carbon black, iron oxide, permanent brown FG, pigment green B, pigment blue 15:3, solvent blue 35, solvent red 49, solvent red 146, quinacridone, carmine 6B, naphthol, disazo yellow, isoindoline, and the like.

In this example, image formation units 11C, 11M, 11Y, and 11K have the same configuration except for the point that the toner images (developer images) are formed by using the toners of different colors as described above. Accordingly, a description is given below by using image formation unit 11C out of these image formation units as a representative.

As illustrated in FIG. 1, image formation unit 11C includes toner cartridge 110 (developer storage container), photosensitive drum 111 (image carrier), charge roller 112 (charge member), development roller 113 (developer carrier), supply roller 114 (supply member), transfer roller 115 (transfer member), cleaning blade 116 (cleaning member), and exposure head 117 (exposure device).

Toner cartridge 110 is a container in which the toner of each color described above is stored. Specifically, in the example of image formation unit 11C, the cyan toner is stored in toner cartridge 110. Similarly, the magenta toner is stored in toner cartridge 110 in image formation unit 11M, the yellow toner is stored in toner cartridge 110 in image formation unit 11Y, and the black toner is stored in toner cartridge 110 in image formation unit 11K.

Photosensitive drum 111 is a member which carries an electrostatic latent image on a surface (surface layer portion), and is formed by using a photosensitive material (for example, an organic photosensitive material). Specifically, photosensitive drum 111 includes a conductive support body and a photoconductive layer covering an outer periphery (surface) of the conductive support body. The conductive support body is formed of, for example, a metal pipe made of aluminum. The photoconductive layer has, for example, a structure in which a charge generation layer and a charge transport layer are sequentially stacked. Note that photosensitive drum 111 rotates at a predetermined peripheral speed.

Charge roller 112 is a member which charges the surface (surface layer portion) of photosensitive drum 111, and is arranged to be in contact with the surface (peripheral surface) of photosensitive drum 111. Charge roller 112 includes, for example, a metal shaft and a semiconductive rubber layer (for example, a semiconductive epichlorohydrin rubber layer) covering an outer periphery (surface) of the metal shaft. Note that charge roller 112 rotates, for example, in a direction opposite to the rotating direction of photosensitive drum 111.

Development roller 113 is a member which carries the toner for development of the electrostatic latent image on the surface, and is arranged to be in contact with the surface (peripheral surface) of photosensitive drum 111. Development roller 113 includes, for example, a metal shaft and a semiconductive urethane rubber layer covering an outer periphery (surface) of the metal shaft. Note that development roller 113 rotates at a predetermined peripheral speed, for example, in a direction opposite to the rotating direction of photosensitive drum 111.

Supply roller 114 is a member which supplies the toner stored in toner cartridge 110 to development roller 113, and is arranged to be in contact with a surface (peripheral surface) of development roller 113. Supply roller 114 includes, for example, a metal shaft and a silicone rubber foam layer covering an outer periphery (surface) of the metal shaft. Note that supply roller 114 rotates, for example, in the same direction as the rotating direction of development roller 113.

Transfer roller 115 is a member which electrostatically transfers the toner image formed in each of image formation units 11C, 11M, 11Y, and 11K onto the recording medium. Transfer roller 115 is arranged to face photosensitive drum 111 in each of image formation units 11C, 11M, 11Y, and 11K with transfer belt 141, to be described later, provided therebetween. Note that transfer roller 115 is made of, for example, a semiconductive elastic rubber foam material.

Cleaning blade 116 is a member which removes (cleans) the toner left on the surface (surface layer portion) of photosensitive drum 111 by scraping the toner off. Cleaning blade 116 is arranged to be in contact with the surface of photosensitive drum 111 in a counter direction (while protruding in a direction opposite to the rotating direction of photosensitive drum 111). Cleaning blade 116 is made of, for example, an elastic material such as polyurethane rubber.

Exposure head 117 is a device which emits light and exposes the surface of photosensitive drum 111 to the emitted light to form the electrostatic latent image on the surface (surface layer portion) of photosensitive drum 111. Exposure head 117 is supported by the upper cover (not illustrated) in case 10. Exposure head 117 includes, for example, multiple light sources which emit the light and a lens array which focuses the emitted light on the surface of photosensitive drum 111. Note that examples of the light sources include, for example, light emitting diodes (LED), laser elements, and the like.

Transfer belt 141 is a belt which conveys the recording medium conveyed from registration rollers 131a and 131b and the like along conveyance direction d by causing the recording medium to electrostatically adsorb to transfer belt 141. Moreover, transfer belt drive roller 142a and transfer belt driven roller 142b are members for operating transfer belt 141. Transfer belt cleaner container 143 is a container for storing the toner scraped off by cleaning blade 116.

Fuser 15 is a device for fusing the toner (toner image) on the recording medium conveyed from transfer belt 141 by applying heat and pressure to the toner. Fuser 15 includes, for example, a fuse belt unit and a pressure roller (not illustrated) which are arranged to face each other with conveyance route d of the recording medium provided therebetween. Note that fuser 15 is integrally installed, for example, in image formation apparatus 1 or is detachably installed in image formation apparatus 1.

Sheet guide 161 is a guide member used when the recording medium on which the toner is fused by fuser 15 is discharged to the outside of image formation apparatus 1. Specifically, in this example, as illustrated in FIG. 1, the recording medium discharged via sheet guide 161 is discharged face down to discharge tray 162 on the upper cover (not illustrated) of case 10. Note that discharge tray 162 is a member (or a component) where the recording media on which images are formed (printed) are stacked.

[Configuration of the Control Mechanism and the Like]

Figure 2:
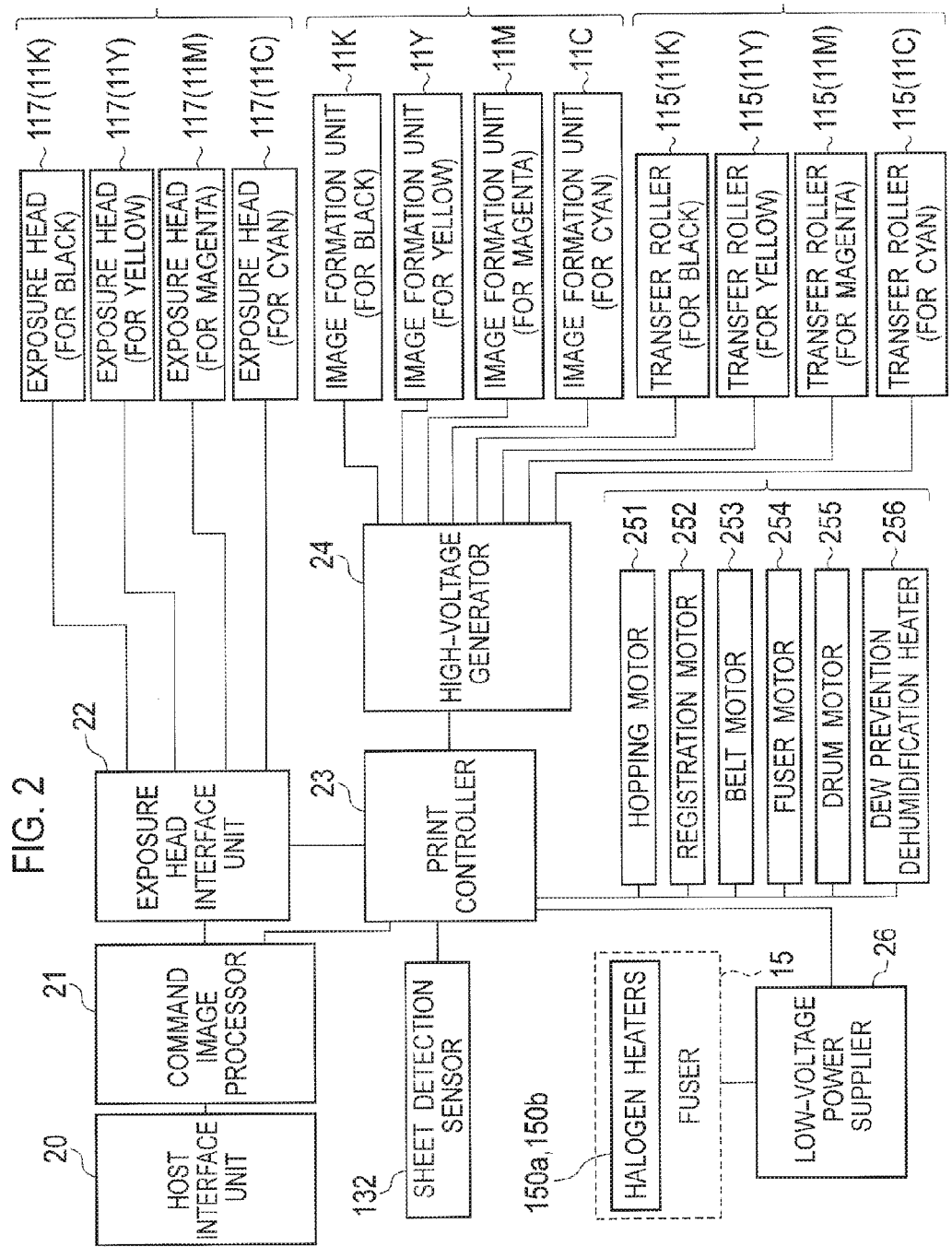
FIG. 2 is a block diagram illustrating an example of a control mechanism and the like of the image formation apparatus illustrated in FIG. 1.

A control mechanism of image formation apparatus 1 is described with reference to FIGS. 2 and 3 in addition to FIG. 1. FIG. 2 is a block diagram illustrating an example of the control mechanism of image formation apparatus 1 and control targets of the control mechanism.

As illustrated in FIG. 2, in this example, the following units are provided as the control mechanism of image formation apparatus 1. Specifically, there are provided host interface unit 20, command image processor 21, exposure head interface unit 22, print controller 23, high-voltage generator 24, sheet detection sensor 132 described above, and low-voltage power supplier 26.

Host interface unit 20 exchanges data with command image processor 21. Specifically, host interface unit 20 has a function of supplying, to command image processor 21, print data (a print job, a print command, and the like) supplied from a higher-level apparatus (external device) such as, for example, a personal computer (PC) via a communication line. Note that the print data is described in, for example, the page description language (PDL) or the like.

Command image processor 21 performs predetermined processes on the print data supplied from host interface unit 20. By these processes, image data (for example, bit-map image data) is supplied to exposure head interface unit 22 and command data is supplied to print controller 23.

As illustrated in FIG. 2, exposure head interface unit 22 controls operations (the light emission operation) of exposure head 117 in each of image formation units 11C, 11M, 11Y, and 11K according to the control by print controller 23.

(Print Controller 23)

Print controller 23 has a function of controlling the entire image formation apparatus 1. Specifically, print controller 23 has functions such as a function of controlling the units in image formation apparatus 1 and causing the units to execute the print process and the like. To be more specific, as illustrated in FIG. 2, print controller 23 has a function of controlling the operations of high-voltage generator 24, various drive mechanisms and the like (in this example, hopping motor 251, registration motor 252, belt motor 253, fuser motor 254, drum motor 255, and dew prevention dehumidification heater 256 which are described later), and low-voltage power supplier 26. Moreover, print controller 23 has a function of controlling operations (the heating operations) of halogen heaters 150a and 150b in fuser 15 via low-voltage power supplier 26, as described later in detail.

Print controller 23 is formed by using, for example, a microcomputer using a central processing unit (CPU), a read only memory (ROM), a random access memory (RAM), and the like. Note that print controller 23 and voltage detection circuit 265 in low-voltage power supplier 26 to be described later are a specific example of a "controller" in the disclosure.

High-voltage generator 24 is a power supplier for applying a high voltage (bias) to the members (charge rollers 112, development rollers 113, supply rollers 114, transfer rollers 115, and the like) in image formation units 11C, 11M, 11Y, and 11K according to the control by print controller 23. Moreover, the control of print controller 23 appropriately controls the magnitude (absolute value) and the like of the high voltage applied to each member.

Hopping motor 251 is a motor for driving hopping roller 122. Registration motor 252 is a motor for driving each of registration rollers 131a and 131b. Belt motor 253 is a motor for driving transfer belt 141 (transfer belt drive roller 142a and the like). Fuser motor 254 is a motor for driving the rotation of a pressure roller in fuser 15. Drum motor 255 is a motor for driving photosensitive drum 111 in each of the image formation units 11C, 11M, 11Y, and 11K. Dew prevention dehumidification heater 256 is a dehumidification heater for preventing dew in case 10 of image formation apparatus 1. Note that dew prevention dehumidification heater 256 is a specific example of "one or a plurality of heaters" and "dew prevention heater" in the disclosure.

Low-voltage power supplier 26 is a power supplier which generates various types of voltages based on a voltage supplied from the outside (for example, commercial power supply 8 to be described later). Low-voltage power supplier 26 controls the operations of the later-described halogen heaters 150a and 150b in fuser 15 according to the control by print controller 23 as described later in detail.

Figure 3:
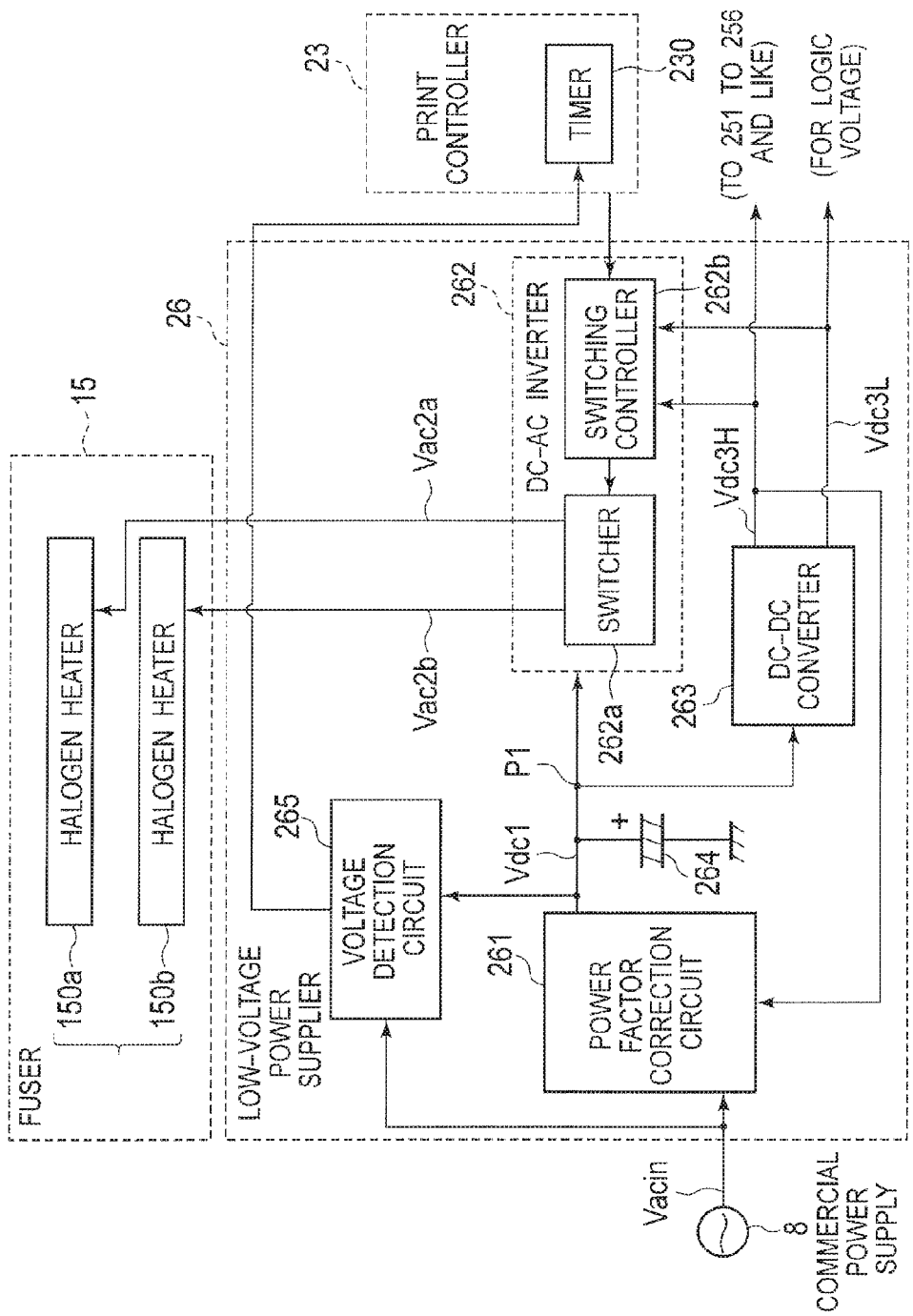
FIG. 3 is a schematic circuit diagram illustrating a detailed configuration example of heaters and the control mechanism thereof illustrated in FIG. 2.

FIG. 3 is a circuit diagram schematically illustrating a detailed configuration example of halogen heaters 150a and 150b and the control mechanism thereof (print controller 23 and low-voltage power supplier 26) illustrated in FIG. 2. Note that print controller 23 and low-voltage power supplier 26 constitute a specific example of a "heater control device" in the disclosure.

(Halogen Heaters 150a and 150b)

Figure 4:
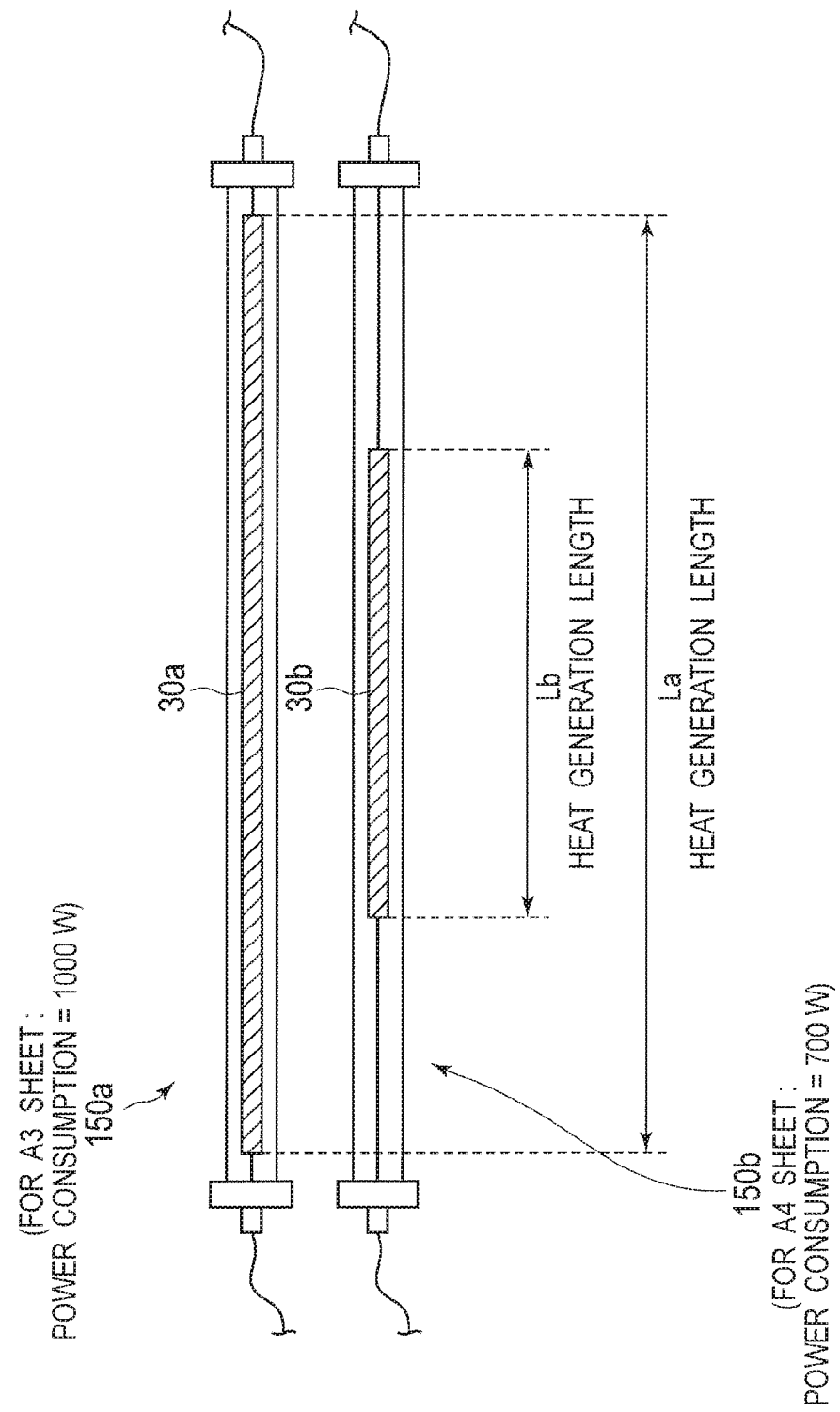
FIG. 4 is a schematic diagram illustrating an example of an overall configuration of the two types of heaters illustrated in FIG. 3.

As illustrated in FIG. 3, multiple types of heaters (two types of halogen heaters 150a and 150b in this example) are provided in fuser 15. FIG. 4 schematically illustrates an example of an overall configuration of the two types of halogen heaters 150a and 150b.

As illustrated in FIG. 4, in this example, filament (heating element) 30a having a heat generation length La, corresponding to a sheet width of an A3-size sheet (recording medium) in the longitudinal feed thereof, is mounted in halogen heater 150a. Meanwhile, filament 30b having a heat generation length Lb (<La), corresponding to a sheet width of an A4-size sheet in longitudinal feed thereof, is mounted in halogen heater 150b. Halogen heaters 150a and 150b are heaters which are different in power consumption, as described in FIG. 4 as an example. Specifically, the power consumption in halogen heater 150a is 1000 W in this example while the power consumption in halogen heater 150b is 700 W in this example. Note that halogen heaters 150a and 150b are a specific example of "one or a plurality of heaters" and "fuser heater" in the disclosure.

The operations of the two types of halogen heaters 150a and 150b in, for example, a normal operation of fuser 15 (normal period ΔT0 to be described later) are controlled, for example, as described below according to the control by the aforementioned print controller 23. Specifically, halogen heaters 150a and 150b are controlled such that one or both of halogen heaters 150a and 150b operate (perform the heating operations), in consideration of the amount of power consumption in each of halogen heaters 150a and 150b, the size of the sheet to be subjected to printing, the maximum usable power in the entire image formation apparatus 1, and the like. To be more specific, for example: only one of halogen heaters 150a and 150b operates while the operation of the other heater is stopped; both of halogen heaters 150a and 150b operate; or one of halogen heaters 150a and 150b operates to assist the other heater.

As illustrated in FIG. 3, print controller 23 includes timer 230. Timer 230 is a circuit for providing a delay of a predetermined time (waiting time) for timings at which the later-described voltage detection circuit 265 in low-voltage power supplier 26 detects voltages (alternating input voltage Vacin and direct voltage Vdc1 to be described later).

(Low-Voltage Power Supplier 26)

Moreover, as illustrated in FIG. 3, low-voltage power supplier 26 includes power factor correction circuit 261, DC-AC inverter 262, DC-DC converter 263, electrolytic capacitor 264, and voltage detection circuit 265.

Power factor correction (PFC) circuit 261 is a circuit (voltage conversion circuit) which generates direct voltage Vdc1 based on an input voltage (alternating input voltage Vacin being a commercial voltage in this example) supplied from the outside (commercial power supply 8 in this example). Alternating input voltage Vacin is, for example, an alternating voltage of about 100 V to 230 V, and direct voltage Vdc1 is, for example, a direct voltage of about 390 V. Note that power factor correction circuit 261 is a specific example of a "first voltage converter" in the disclosure, alternating input voltage Vacin is a specific example of an "external input voltage" in the disclosure, and direct voltage Vdc1 is a specific example of a "first voltage" and is also a specific example of a "load change (of the first voltage converter)" in the disclosure.

DC-AC inverter 262 is a circuit (voltage conversion circuit) which generates alternating voltages Vac2a and Vac2b based on direct voltage Vdc1 outputted from power factor correction circuit 261. The alternating voltages Vac2a and Vac2b are used to individually supply power (supply alternating-current power) to halogen heaters 150a and 150b in fuser 15 described above. Note that, as illustrated in FIG. 3, the generated alternating voltage Vac2a is utilized to supply power to halogen heater 150a and the generated alternating voltage Vac2b is utilized to supply power to halogen heater 150b. As illustrated in FIG. 3, DC-AC inverter 262 includes switcher 262a which includes one or multiple switching elements and switching controller 262b which controls an on-off operation of each switching element in switcher 262a. Note that the control of the on-off operation in this case is performed by using, for example, pulse width modulation (PWM). DC-AC inverter 262 is a specific example of a "second voltage converter" in the disclosure and alternating voltages Vac2a and Vac2b are specific examples of a "second voltage" in the disclosure.

DC-DC converter 263 is a circuit (voltage conversion circuit) which generates two types of direct voltages Vdc3H and Vdc3L in this example, based on direct voltage Vdc1 outputted from power factor correction circuit 261, and is a step-down DC-DC converter in this example. Direct voltage Vdc3H is a direct voltage of, for example, about 24 V and is supplied to the various drive mechanisms and the like (hopping motor 251, registration motor 252, belt motor 253, fuser motor 254, drum motor 255, and dew prevention dehumidification heater 256) illustrated in FIG. 2. Meanwhile, direct voltage Vdc3L is a direct voltage of, for example, about 5 V and is utilized as, for example, a logic voltage in various logical circuits (print controller 23 and the like) as illustrated in FIG. 3. Moreover, in this example, as illustrated in FIG. 3, direct voltages Vdc3H and Vdc3L are also supplied to switching controller 262b in DC-AC inverter 262 and direct voltage Vdc3H is also supplied to power factor correction circuit 261. DC-DC converter 263 is formed of, for example, a general self-exciting flyback converter including a switching element, a transformer, and the like. Note that DC-DC converter 263 is a specific example of a "third voltage converter" in the disclosure and direct voltage Vdc3H is a specific example of a "third voltage" (a voltage used when the one or plurality of heaters are driven, a voltage applied to the one or plurality of heaters) in the disclosure.

As illustrated in FIG. 3, electrolytic capacitor 264 is electrically connected to a route between power factor correction circuit 261 and a set of DC-AC inverter 262 and DC-DC converter 263 (arranged on the route in this example). Specifically, in this example, electrolytic capacitor 264 is arranged to be inserted between the ground and a route (output route of direct voltage Vdc1) between an output terminal of power factor correction circuit 261 and connection point P1 (being a connection point between an input terminal of DC-AC inverter 262 and an input terminal of DC-DC converter 263). Electrolytic capacitor 264 is a capacitor provided as a measure against a decrease of alternating input voltage Vacin (for an instantaneous voltage drop or an instantaneous interruption to be described later). Note that electrolytic capacitor 264 is a specific example of a "capacitive element" in the disclosure.

Voltage detection circuit 265 is a circuit (voltage detector) which detects the aforementioned alternating input voltage Vacin and direct voltage Vdc1 from time to time, and is formed of, for example, a general voltage detection circuit using a resistive potential divider and the like. As illustrated in FIG. 3, voltage detection circuit 265 outputs detection result signals of alternating input voltage Vacin and direct voltage Vdc1 to the aforementioned timer 230 in print controller 23.

(Operation Control by Print Controller 23 and Voltage Detection Circuit 265)

In the embodiment, the aforementioned print controller 23 and voltage detection circuit 265 have a function of performing a control, such as an operation control of reducing the power consumption in at least halogen heaters 150a and 150b when predetermined conditions are satisfied.

Specifically, print controller 23 first determines whether alternating input voltage Vacin detected by voltage detection circuit 265 has decreased to a range of a later-described predetermined threshold voltage Vth1 or lower, and higher than a later-described predetermined threshold voltage Vth2 (Vth2<Vacin≤Vth1 (instantaneous voltage drop to be described later)). Then, print controller 23 determines whether direct voltage Vdc1 detected by voltage detection circuit 265 is lower than a later-described predetermined threshold voltage Vth3 (that is, Vdc1<Vth3 is satisfied because the load change of power factor correction circuit 261 is small).

Next, when the load change of power factor correction circuit 261 is small in the instantaneous voltage drop state described above, print controller 23 stops the operation of DC-AC inverter 262 (the operation of generating alternating voltages Vac2a and Vac2b) and also performs a predetermined shutdown process to be described later.

Figure 7:
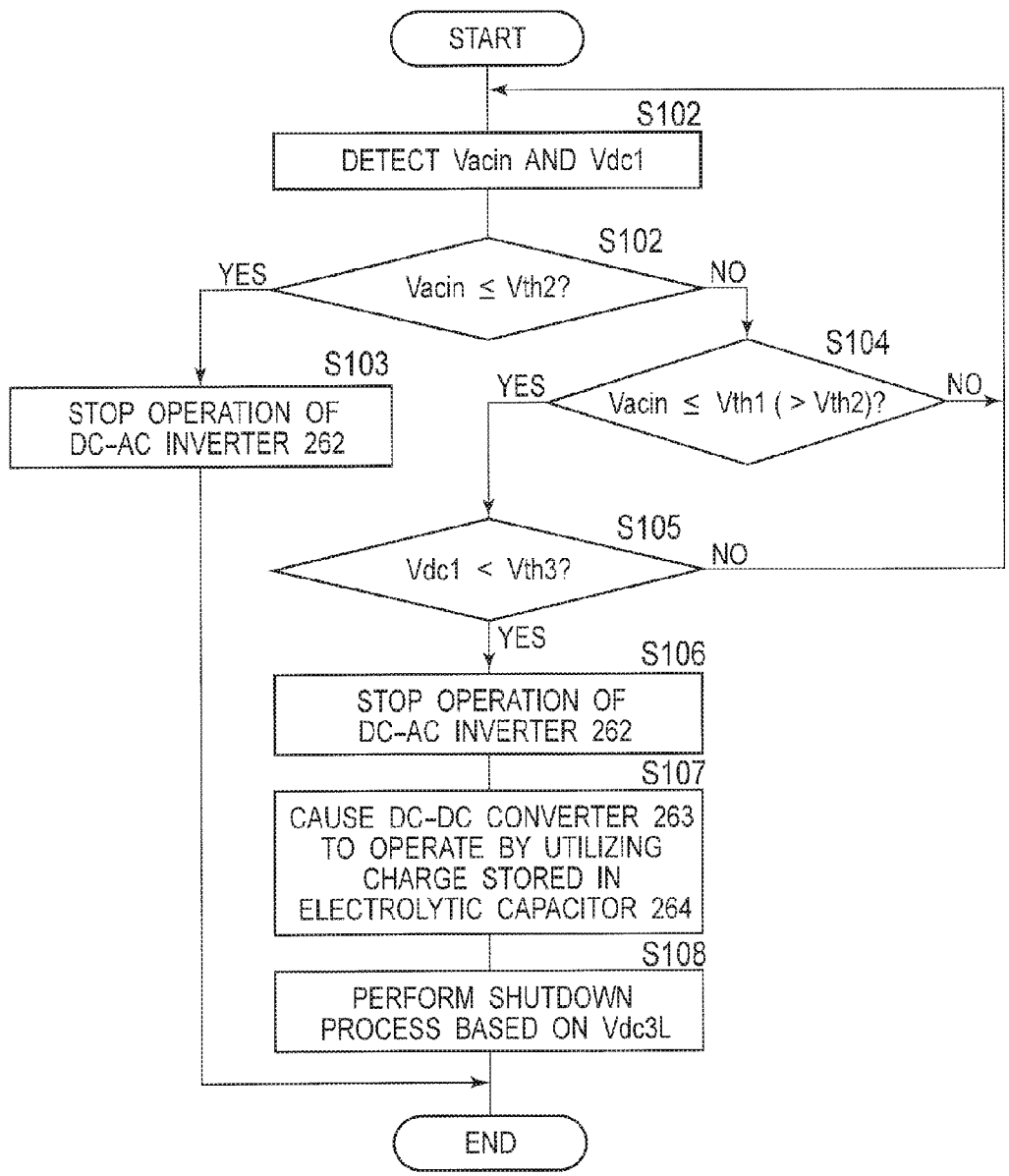
FIG. 7 is a flowchart depicting an example of a control operation in the embodiment.
Figure 8:
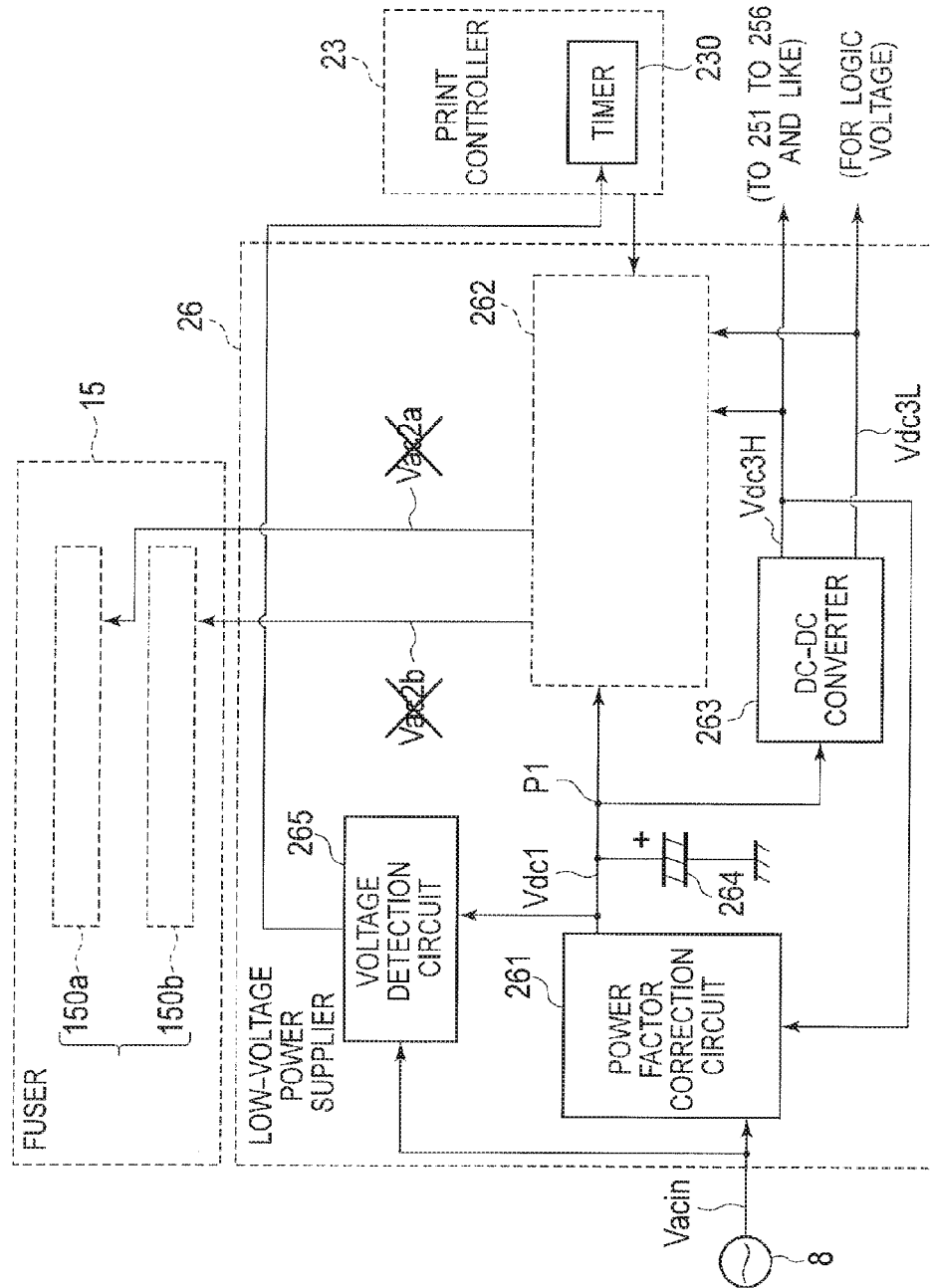
FIG. 8 is a schematic circuit diagram illustrating an example of an operation state in the control operation depicted in FIG. 7.
Figure 9:
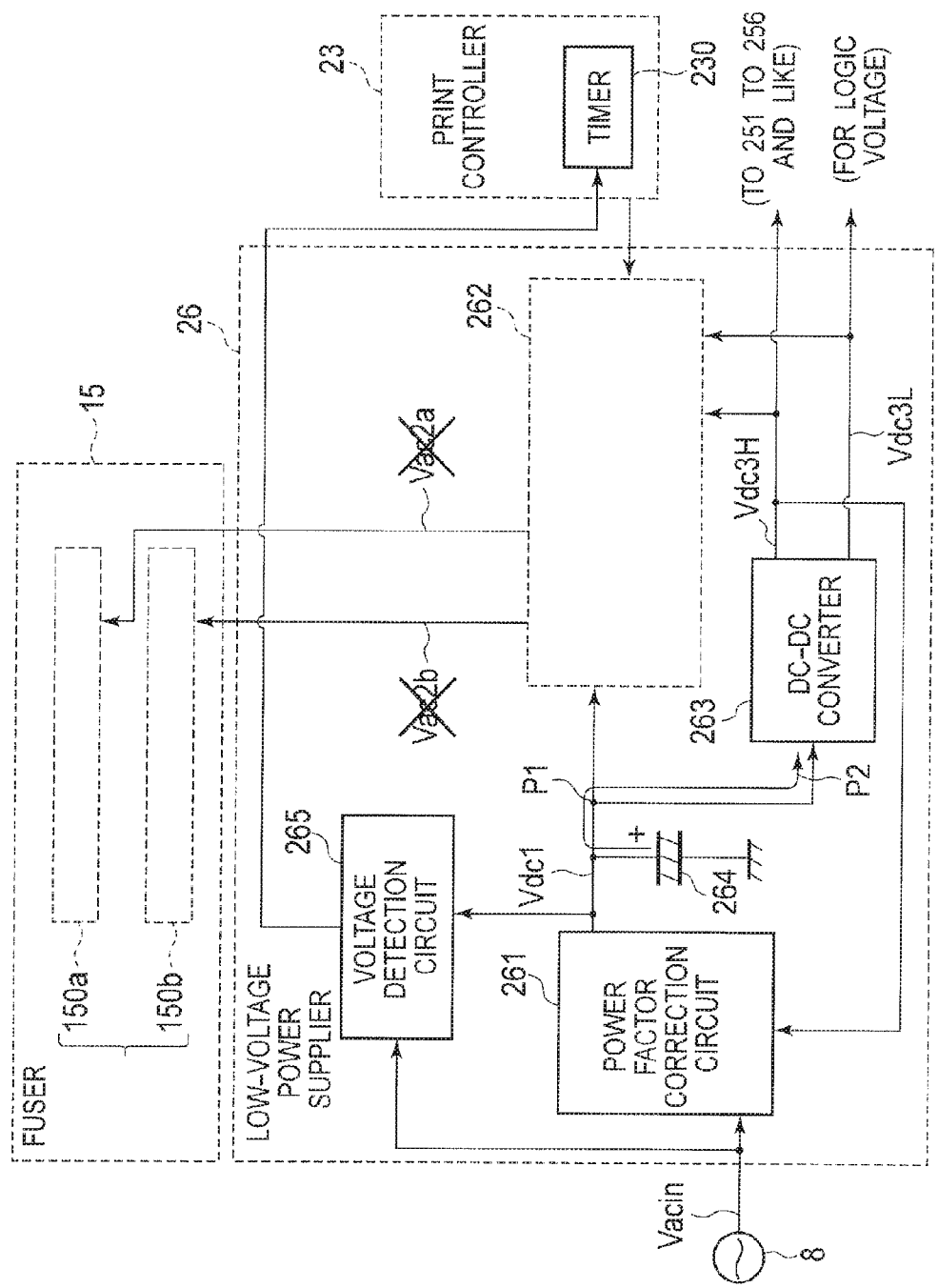
FIG. 9 is a schematic circuit diagram illustrating another example of an operation state in the control operation depicted in FIG. 7.

Note that details of such control operations (control processes in the instantaneous voltage drop, a small load, and the like) by print controller 23 and voltage detection circuit 265 are described later (FIGS. 7 to 9).

[Operations and Effects]

(A. Basic Operations of Image Formation Apparatus 1 as a Whole)

Image formation apparatus 1 forms an image (image layer) on a recording medium as follows. Specifically, as illustrated in FIG. 2, when the print job is supplied from the aforementioned higher-level apparatus to print controller 23 via the communication line and the like, print controller 23 executes the print process based on the print job such that the members in image formation apparatus 1 perform the following operations.

Specifically, as illustrated in FIG. 1, hopping roller 122 first separately picks up the recording media stored in sheet cassette 121 one by one from the top portion and feeds out each recording medium toward registration rollers 131a and 131b. Next, registration rollers 131a and 131b correct any skewing of the recording medium fed out from hopping roller 122, and then convey the recording medium toward transfer belt 141. The recording medium conveyed as described above is conveyed in conveyance direction d by transfer belt 141 while the toner images formed by image formation units 11C, 11M, 11Y, and 11K as described below are sequentially transferred onto the recording medium conveyed in conveyance direction d.

Each of image formation units 11C, 11M, 11Y, and 11K forms the toner image of its corresponding color by performing an electrophotographic process described below.

Specifically, first, charge roller 112 to which an application voltage is supplied from high-voltage generator 24 uniformly charges the surface (surface layer portion) of photosensitive drum 111. Then, exposure head 117 emits light and exposes the surface of photosensitive drum 111 to the emitted light, and the electrostatic latent image corresponding to a print pattern specified by the aforementioned print job is thereby formed on photosensitive drum 111.

Meanwhile, supply roller 114 to which an application voltage is supplied from high-voltage generator 24 is in contact with development roller 113 to which an application voltage is similarly supplied from high-voltage generator 24, and supply roller 114 and development roller 113 rotate at predetermined peripheral speeds, respectively. The toner is thereby supplied from supply roller 114 onto the surface of development roller 113.

Next, the toner on development roller 113 is charged by friction with a toner restriction member (not illustrated) in contact with development roller 113 and the like. In this case, the voltage applied to development roller 113, the voltage applied to supply roller 114, the pressing force of the toner restriction member (voltage applied to the toner restriction member), and the like determine the thickness of a toner layer on development roller 113.

Moreover, since development roller 113 is in contact with photosensitive drum 111, supplying the application voltage from high-voltage generator 24 to development roller 113 causes the toner on development roller 113 to attach to the electrostatic latent image on photosensitive drum 111.

Thereafter, the toner (toner image) on photosensitive drum 111 is transferred onto the recording medium by an electric field between photosensitive drum 111 and transfer roller 115. Note that the toner left on the surface of photosensitive drum 111 is removed by being scraped off by cleaning blade 116 and is stored in transfer belt cleaner container 143.

As described above, the toner images of the respective colors are formed in image formation units 11C, 11M, 11Y, and 11K and are sequentially transferred onto the recording medium conveyed in conveyance direction d described above.

Specifically, as illustrated in FIG. 1, each of image formation units 11C, 11M, 11Y, and 11K forms a layer (image layer) composed of the toner image of the corresponding color, by using the toner of the corresponding color (cyan toner, magenta toner, yellow toner, or black toner).

Next, as illustrated in FIG. 1, fuser 15 fuses the toners on the recording medium conveyed from transfer belt 141 by applying heat and pressure. Specifically, fuser 15 performs the fusing operation such that the recording medium conveyed in conveyance direction d is heated and pressed while being nipped by a nip portion (not illustrated) formed between the fuse belt (not illustrated) and the pressure roller (not illustrated).

The recording medium subjected to the fusing operation as described above is discharged via sheet guide 161 to the outside of image formation apparatus 1 (onto discharge tray 162 in this example). The image formation operation in image formation apparatus 1 is thus completed.

(B. Basic Operations of Low-Voltage Power Supplier 26)

In the image formation operation described above, low-voltage power supplier 26 illustrated in FIGS. 2 and 3 operates as follows.

Specifically, first, when power factor correction circuit 261 receives alternating input voltage Vacin from commercial power supply 8, power factor correction circuit 261 generates direct voltage Vdc1 based on alternating input voltage Vacin. Next, DC-AC inverter 262 generates alternating voltages Vac2a and Vac2b based on direct voltage Vdc1 generated as described above. Then, halogen heaters 150*a* and 150*b* in fuser 15 receive alternating voltages Vac2a and Vac2b and perform the heating operations in the aforementioned fusing operation.

Meanwhile, DC-DC converter 263 generates two types of direct voltages Vdc3H and Vdc3L based on the aforementioned direct voltage Vdc1. Direct voltage Vdc3H (for example, about 24 V) generated as described above is supplied to the various drive mechanisms and the like (hopping motor 251, registration motor 252, belt motor 253, fuser motor 254, drum motor 255, and dew prevention dehumidification heater 256) illustrated in FIG. 2. Meanwhile, direct voltage Vdc3L (for example, about 5 V) is utilized as, for example, the logic voltage in the various logical circuits (print controller 23 and the like) as illustrated in FIG. 3. Note that direct voltages Vdc3H and Vdc3L are also supplied to switching controller 262*b* in DC-AC inverter 262 as illustrated in FIG. 3. Moreover, direct voltage Vdc3H is also supplied to power factor correction circuit 261.

In this case, voltage detection circuit 265 detects alternating input voltage Vacin inputted to low-voltage power supplier 26 and direct voltage Vdc1 outputted from power factor correction circuit 261 in low-voltage power supplier 26 from time to time. The detection result signals of alternating input voltage Vacin and direct voltage Vdc1 in voltage detection circuit 265 are supplied to timer 230 in print controller 23 as illustrated in FIG. 3. The detection result signals are utilized in control functions, such as in the operation control of reducing the power consumption, as described later in detail.

(C. Control Processes in Instantaneous Voltage Drop and Instantaneous Interruption)

There may be a case where alternating input voltage Vacin to be inputted to low-voltage power supplier 26 as described above decreases depending on a situation, as in the following example.

Figure 5:
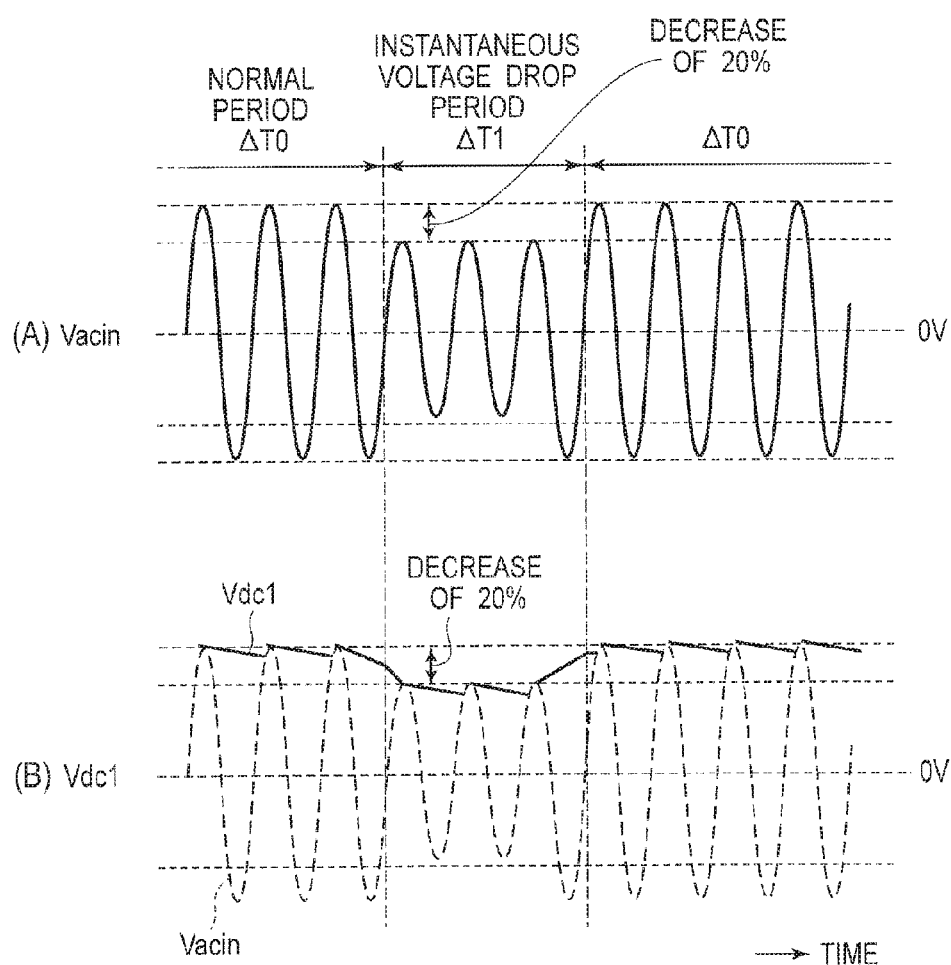
FIG. 5 illustrates timing waveform diagrams (A) and (B) depicting an example of the case where an external input voltage decreases (instantaneous voltage drop).

Specifically, as illustrated in for example waveform (A) of FIG. 5, there may be a case where alternating input voltage Vacin decreases by some extent (about 20% in this example) with respect to a value in normal period ΔT0 (100%). In this case, as illustrated in for example waveform (B) of FIG. 5, direct voltage Vdc1 generated by power factor correction circuit 261 based on this alternating input voltage Vacin also decreases by about 20% in this example. Such a decrease of alternating input voltage Vacin by some extent (decrease to a voltage of threshold voltage Vth1 or lower to be described later) is referred to as a "instantaneous voltage drop" state in the following description, and a period of the instantaneous voltage drop state is defined as instantaneous voltage drop period ΔT1 as illustrated in FIG. 5.

Figure 6:
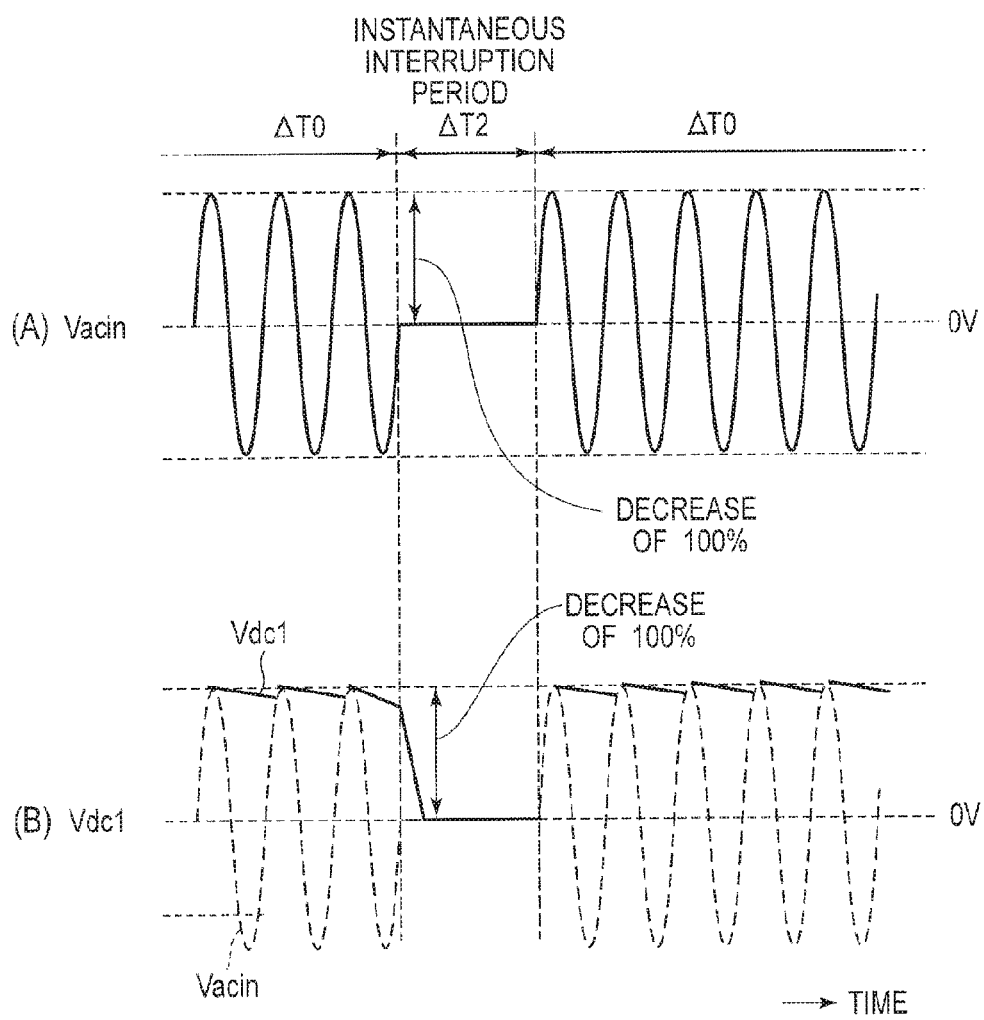
FIG. 6 illustrates timing waveform diagrams (A) and (B) depicting another example of the case where the external input voltage decreases (instantaneous interruption).

Moreover, as illustrated in for example waveform (A) of FIG. 6, there may be a case where alternating input voltage Vacin decreases by an extremely large amount (about 100% in this example) (decreases to almost 0 V) with respect to the value in normal period ΔT0 (100%). In this case, as illustrated in for example waveform (B) of FIG. 6, direct voltage Vdc1 generated by power factor correction circuit 261 based on this alternating input voltage Vacin also decreases by about 100% in this example. Such a decrease of alternating input voltage Vacin (decrease to a voltage of threshold voltage Vth2 or lower to be described later) is referred to as an "instantaneous interruption" state in the following description, and a period of the instantaneous interruption state is defined as instantaneous interruption period ΔT2 as illustrated in FIG. 6.

In this case, in image formation apparatus 1 of the embodiment, print controller 23 and voltage detection circuit 265 perform the following operation control in such instantaneous voltage drop and instantaneous interruption as described below in detail. Specifically, print controller 23 and voltage detection circuit 265 perform the operation control of reducing the power consumption in at least halogen heaters 150*a* and 150*b* when the predetermined conditions are satisfied.

To be more specific, print controller 23 first determines whether alternating input voltage Vacin is in the instantaneous voltage drop state. Then, print controller 23 determines whether the load change of power factor correction circuit 261 is small (whether power factor correction circuit 261 is in a small load state). Next, when the load change of power factor correction circuit 261 is small in the instantaneous voltage drop state, print controller 23 stops the operation of DC-AC inverter 262 and performs the predetermined shutdown process to be described later.

The following operations can be obtained in the embodiment by performing such operation control. Specifically, when the load change of power factor correction circuit 261 is small in the instantaneous voltage drop state of alternating input voltage Vacin, the power consumption in at least halogen heaters 150*a* and 150*b* is reduced.

(D. Specific Control Processes)

Next, specific control processes (operation control of reducing the power consumption) by print controller 23 and voltage detection circuit 265 in the aforementioned instantaneous voltage drop, instantaneous interruption, and the like are described in further detail with reference to FIGS. 7 to 9.

FIG. 7 depicts a flowchart of an example of such control processes in the embodiment.

Note that, in FIG. 7, threshold voltage Vth1 is a threshold indicating a boundary between the normal state and the instantaneous voltage drop state of alternating input voltage Vacin, and is a value of about 80% in this example with respect to the value of alternating input voltage Vacin in normal period ΔT0 (100%). Moreover, threshold voltage Vth2 is a threshold indicating a boundary between the instantaneous voltage drop state and the instantaneous interruption state of alternating input voltage Vacin, and is a value of about 20% in this example with respect to the value of alternating input voltage Vacin in normal period ΔT0 (100%). In other words, threshold voltage Vth1>threshold voltage Vth2 is satisfied. Note that the values of threshold voltages Vth1 and Vth2 can be arbitrarily changed (adjusted) in, for example, a design phase. Moreover, threshold voltage Vth1 is a specific example of a "first threshold" in the disclosure, and threshold voltage Vth2 is a specific example of a "second threshold" in the disclosure.

Moreover, in FIG. 7, threshold voltage Vth3 is a threshold indicating a boundary between a state where the load change of power factor correction circuit 261 is small (power factor correction circuit 261 is in the small load state) and a state where the load change is not small, and corresponds to, for example, an upper limit voltage value at which DC-DC converter 263 is allowed to operate. Note that threshold voltage Vth3 is a specific example of a "third threshold" in the disclosure.

FIGS. 8 and 9 are each a circuit diagram schematically illustrating an example of an operation state of low-voltage power supplier 26 and halogen heaters 150a and 150b in the control operation depicted in FIG. 7. Note that, in FIGS. 8 and 9, the blocks entirely surrounded by broken lines and the insides of which are blank schematically indicate that operations of the blocks are stopped. Moreover, in FIGS. 8 and 9, the portions with "X" (cross sign) schematically indicate that the power supply (the supply of alternating voltages Vac2a and Vac2b in this example) to the corresponding blocks is stopped.

(Processes of Determining Instantaneous Interruption)

In these control processes, voltage detection circuit 265 first detects alternating input voltage Vacin and direct voltage Vdc1 (step S101 of FIG. 7). Then, print controller 23 determines whether detected alternating input voltage Vacin is equal to or lower than the aforementioned threshold voltage Vth2 (Vacin≤Vth2 is satisfied) (step S102). In other words, print controller 23 determines whether alternating input voltage Vacin is in the aforementioned instantaneous interruption state. In this case, when print controller 23 determines that alternating input voltage Vacin is not equal to or lower than threshold voltage Vth2 (Vacin≤Vth2 is not satisfied), that is, the state of alternating input voltage Vacin does not fall into the instantaneous interruption state (step S102: N), the process proceeds to step S104 (a process of determining the instantaneous voltage drop) to be described later.

(Operation Control in Instantaneous Interruption)

Meanwhile, when print controller 23 determines that alternating input voltage Vacin is equal to or lower than threshold voltage Vth2 (Vacin≤Vth2 is satisfied), that is, the state of alternating input voltage Vacin falls into the instantaneous interruption state (step S102: Y), print controller 23 then performs an operation control in the instantaneous interruption described below.

Specifically, print controller 23 performs the control of stopping the operation of DC-AC inverter 262 in low-voltage power supplier 26 (step S103). More specifically, print controller 23 performs the control of stopping the operation of DC-AC inverter 262, for example, by utilizing a switching control of switcher 262a or by stopping the operation of switching controller 262b.

Since the operation of DC-AC inverter 262 is stopped as described above and as illustrated in for example FIG. 8, no power is supplied to halogen heaters 150a and 150b. Specifically, no alternating voltages Vac2a and Vac2b are supplied respectively to halogen heaters 150a and 150b and, as a result, the operations of halogen heaters 150a and 150b are stopped.

Moreover, since the operation of DC-AC inverter 262 is stopped, there is no need to store charge for operating DC-AC inverter 262 in electrolytic capacitor 264. In other words, it is necessary to store only the charge for operating DC-DC converter 263. There is no need to store the charge for supplying power to halogen heaters 150a and 150b which accounts for a large portion of the charge stored in the conventional capacitor. As a result, in the embodiment, electrolytic capacitor 264 is required to have only a small capacity.

Note that, in this case, a series of control processes illustrated in FIG. 7 is completed in step S103.

(Process of Determining Instantaneous Voltage Drop)

Meanwhile, when print controller 23 determines that alternating input voltage Vacin is not equal to or lower than threshold voltage Vth2 (Vacin≤Vth2 is not satisfied), that is, the state of alternating input voltage Vacin does not fall into the instantaneous interruption state (step S102: N), print controller 23 then determines whether alternating input voltage Vacin is in the aforementioned instantaneous voltage drop state. Specifically, print controller 23 determines whether alternating input voltage Vacin is equal to or lower than the aforementioned threshold voltage Vth1 (Vacin≤Vth1 (>Vth2)) is satisfied) (step S104). When print controller 23 determines that alternating input voltage Vacin is not equal to or lower than threshold voltage Vth1 (Vacin≤Vth1 is also not satisfied), that is, the state of alternating input voltage Vacin also does not fall into the instantaneous voltage drop state in this case (step S104: N), print controller 23 determines that it is normal period ΔT0 and the process returns to first step S101.

(Process of Determining Small Load)

Meanwhile, when print controller 23 determines that alternating input voltage Vacin is equal to or lower than threshold voltage Vth1 (Vacin≤Vth1 is satisfied), that is, the state of alternating input voltage Vacin falls into the instantaneous voltage drop state (step S104: Y), print controller 23 then determines whether the load change of power factor correction circuit 261 is small (power factor correction circuit 261 is in the small load state). Specifically, print controller 23 determines whether direct voltage Vdc1 detected in step S101 is lower than the aforementioned threshold voltage Vth3 (Vdc1<Vth3 is satisfied) (step S105). In this case, when print controller 23 determines that direct voltage Vdc1 is not lower than threshold voltage Vth3 (Vdc1<Vth3 is not satisfied), that is, the state of alternating input voltage Vacin falls into the instantaneous voltage drop state but the state of power factor correction circuit 261 does not fall into the small load state (step S105: N), print controller 23 determines that it is normal period ΔT0 and the process returns to first step S101.

(Operation Control in Instantaneous Voltage Drop and Small Load)

Meanwhile, when print controller 23 determines that direct voltage Vdc1 is lower than threshold voltage Vth3 (Vdc1<Vth3 is satisfied), that is, the state of alternating input voltage Vacin falls into the instantaneous voltage drop state and the state of power factor correction circuit 261 falls into the small load state (step S105: Y), print controller 23 then performs an operation control in the instantaneous voltage drop and the small load to be described below (steps S106 to S108).

Specifically, print controller 23 first performs the control of stopping the operation of DC-AC inverter 262 in low-voltage power supplier 26 (step S106). Also in this case, print controller 23 performs the control of stopping the operation of DC-AC inverter 262, for example, by utilizing the switching control of switcher 262a or by stopping the operation of switching controller 262b.

Since the operation of DC-AC inverter 262 is stopped as described above and as illustrated in for example FIG. 9, no power is supplied to halogen heaters 150a and 150b. Specifically, no alternating voltages Vac2a and Vac2b are supplied to halogen heaters 150a and 150b and, as a result, the operations of halogen heaters 150a and 150b are stopped. Since the operations of halogen heaters 150a and 150b with large power consumption are stopped as described above, the power consumption in image formation apparatus 1 as a whole is reduced.

Next, after the operation of DC-AC inverter 262 is stopped by the aforementioned operation control, as illustrated for example by arrow P2 in FIG. 9, the charge stored in electrolytic capacitor 264 (stored charge) is supplied to DC-DC converter 263. DC-DC converter 263 thus operates by utilizing this stored charge (step S107).

As described above, also in this case, there is no need to store both the charge for supplying power to halogen heaters 150a and 150b and the charge for operating DC-DC converter 263 in electrolytic capacitor 264 (it is necessary to store only the charge for operating DC-DC converter 263 in electrolytic capacitor 264). Accordingly, as described above, electrolytic capacitor 264 is required to have only a small capacity.

Next, print controller 23 performs a shutdown process of image formation apparatus 1 based on the power (direct voltage Vdc3L) supplied from DC-DC converter 263 which operates by utilizing the stored charge (step S108). Specifically, the shutdown process is a process of storing various pieces of information such as, for example, the print job and print settings. Such various pieces of information can be thereby stored.

The series of control processes illustrated in FIG. 7 is thus completed.

In the embodiment, as described above, since print controller 23 and voltage detection circuit 265 perform the operation control of reducing power consumption in at least halogen heaters 150a and 150b when the aforementioned predetermined conditions are satisfied, the following is achieved. Specifically, when alternating input voltage Vacin is in the instantaneous voltage drop state and the load change in power factor correction circuit 261 is small, the power consumption in at least halogen heaters 150a and 150b is reduced. Since the operations of at least halogen heaters 150a and 150b with large power consumption is stopped, the power consumption of image formation apparatus 1 as a whole can be reduced.

Moreover, as described above, since electrolytic capacitor 264 is required to have only a small capacity, it is possible to reduce the mounting area of electrolytic capacitor 264 and reduce the component cost of electrolytic capacitor 264.

2. Modified Examples

Next, modified examples (Modified Examples 1 and 2) of the aforementioned embodiment are described. Note that components which are the same as those in the embodiment are denoted by the same reference numerals and any description thereof is omitted as appropriate.

Modified Example 1

(Configuration)

Figure 10:
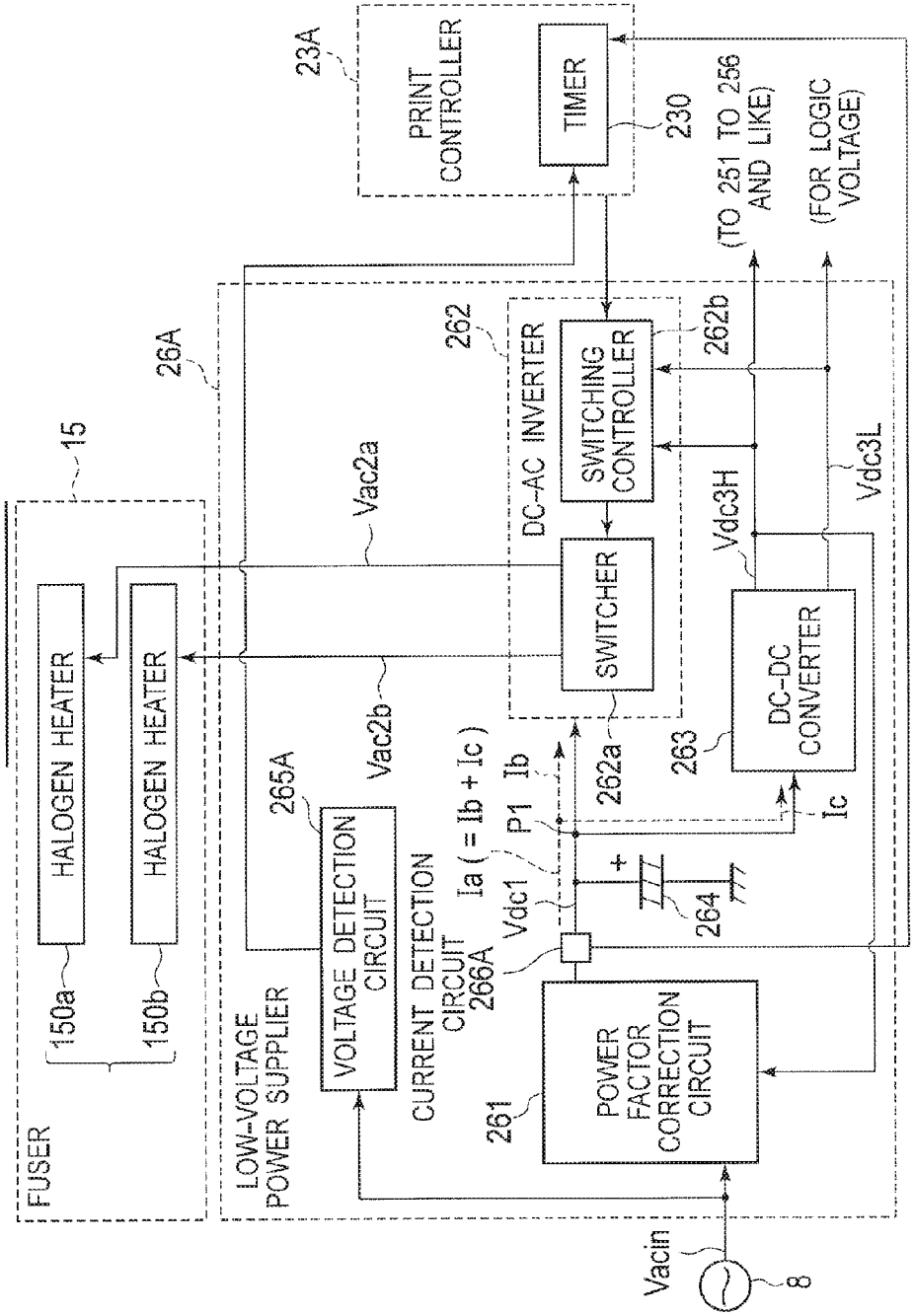
FIG. 10 is a schematic circuit diagram illustrating a configuration example of heaters and a control mechanism thereof in Modified Example 1.

FIG. 10 is a schematic circuit diagram illustrating a detailed configuration example of halogen heaters 150a and 150b and a control mechanism thereof (print controller 23A and low-voltage power supplier 26A) in Modified Example 1. Note that print controller 23A and low-voltage power supplier 26A are a specific example of a "heater control device" in the disclosure.

Low-voltage power supplier 26A corresponds to low-voltage power supplier 26 in the embodiment illustrated in FIG. 3 in which voltage detection circuit 265A and current detection circuit 266A are provided instead of voltage detection circuit 265. Other configurations of low-voltage power supplier 26A are basically the same as the configurations of low-voltage power supplier 26.

Unlike voltage detection circuit 265 which detects alternating input voltage Vacin and direct voltage Vdc1 from time to time, voltage detection circuit 265A is a circuit (voltage detector) which detects only alternating input voltage Vacin from time to time as illustrated in FIG. 10. Voltage detection circuit 265A is also formed of a general voltage detection circuit using, for example, a resistive potential divider and the like. As illustrated in FIG. 10, voltage detection circuit 265A outputs a detection result signal of alternating input voltage Vacin to timer 230 in print controller 23A.

As illustrated in FIG. 10, current detection circuit 266A is a circuit (current detector) which detects total output current Ia from time to time. Total output current Ia is a current outputted from power factor correction circuit 261 to DC-AC inverter 262 and DC-DC converter 263. Specifically, total output current Ia refers to a current (Ia=Ib+Ic) obtained by adding up an output current flowing from power factor correction circuit 261 to DC-AC inverter 262 (individual output current Ib) and an output current flowing from power factor correction circuit 261 to DC-DC converter 263 (individual output current Ic). Current detection circuit 266A is formed of, for example, a general current detection circuit using a current transformer and the like. Note that total output current Ia is a specific example representing a "load change (of the first voltage converter)" in the disclosure.

Like print controller 23 described in the embodiment, print controller 23A has a function of performing control, such as an operation control of reducing the power consumption in at least halogen heaters 150a and 150b when predetermined conditions are satisfied. Note that print controller 23A and voltage detection circuit 265A and current detection circuit 266A in low-voltage power supplier 26A are a specific example of a "controller" in the disclosure.

Specifically, print controller 23A first determines whether alternating input voltage Vacin detected by voltage detection circuit 265A has decreased to a range of threshold voltage Vth1 or lower and higher than threshold voltage Vth2 (Vth2<Vacin≤Vth1 is satisfied: instantaneous voltage drop). Then, print controller 23A determines whether total output current Ia detected by current detection circuit 266A is lower than predetermined threshold current Ith3a to be described later (Ia<Ith3a is satisfied: the load change of power factor correction circuit 261 is small).

When the load change of power factor correction circuit 261 is small in the instantaneous voltage drop state described above, print controller 23A performs the aforementioned operation control of reducing the power consumption by performing an operation control of transitioning to an energy saving mode to be described later.

(Operations and Effects)

Next, operations and effects of print controller 23A and low-voltage power supplier 26A in Modified Example 1 are described. Note that, since basic operations are the same as those in the embodiment, description thereof is omitted as appropriate.

Figure 11:
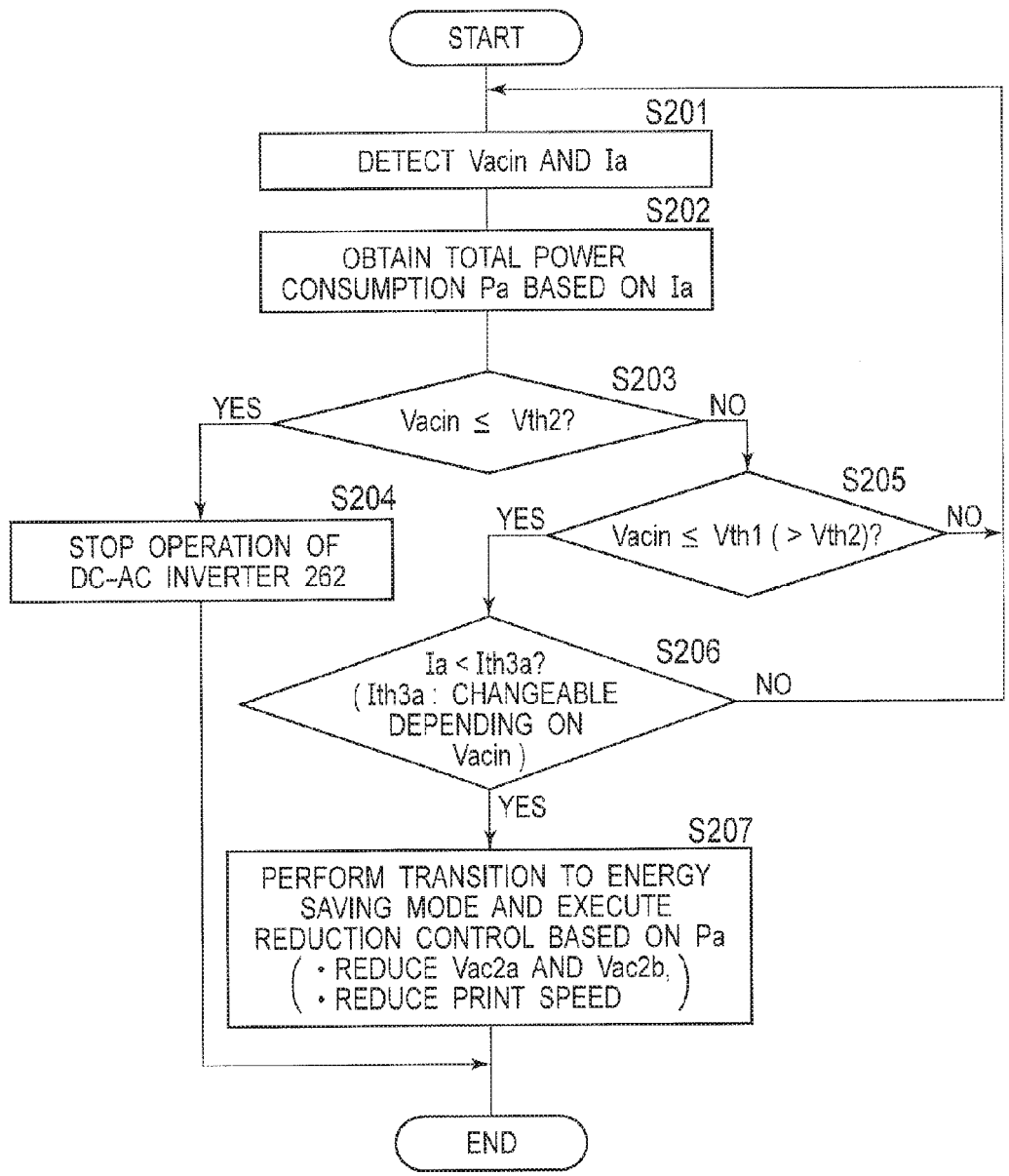
FIG. 11 is a flowchart illustrating an example of a control operation in Modified Example 1.

FIG. 11 is a flowchart illustrating an example of control processes in Modified Example 1 (operation control of reducing the power consumption which is performed by print controller 23A, voltage detection circuit 265A, and current detection circuit 266A in the instantaneous voltage drop, the instantaneous interruption, and the like).

Note that, in FIG. 11, threshold current Ith3a is a threshold indicating a boundary between a state where the load change of power factor correction circuit 261 is small (power factor correction circuit 261 is in a small load state) and a state where the load change is not small. Threshold current Ith3a is determined by using, for example, a total value of heater currents and motor currents. For example, the heater currents refer to currents flowing in halogen heaters 150a and 150b, dew prevention dehumidification heater 256, and the like. Meanwhile, the motor currents refer to currents flowing in the various motors described above (hopping motor 251, registration motor 252, belt motor 253, fuser motor 254, drum motor 255, and the like). Threshold current Ith3a which is described in detail later is set to be changeable depending on the magnitude of alternating input voltage Vacin. Note that threshold current Ith3a is a specific example of a "third threshold" in the disclosure.

In the control processes, first, voltage detection circuit 265A detects alternating input voltage Vacin, and current detection circuit 266A detects total output current Ia (step S201 of FIG. 11). Then, print controller 23A obtains total power consumption Pa based on the detected total output current Ia, total power consumption Pa being a total value of power consumption in DC-AC inverter 262 and DC-DC converter 263 (step S202).

Then, as in the embodiment (step S102 of FIG. 7), print controller 23A determines whether detected alternating input voltage Vacin is equal to or lower than threshold voltage Vth2 (Vacin≤Vth2 is satisfied) (step S203). In other words, print controller 23A determines whether alternating input voltage Vacin is in the instantaneous interruption state. In this case, when print controller 23A determines that alternating input voltage Vacin is not equal to or lower than threshold voltage Vth2 (Vacin≤Vth2 is not satisfied), that is, the state of alternating input voltage Vacin does not fall into the instantaneous interruption state (step S203: N), the process proceeds to step S205 (a process of determining the instantaneous voltage drop) to be described later.

Meanwhile, when print controller 23A determines that alternating input voltage Vacin is equal to or lower than threshold voltage Vth2 (Vacin≤Vth2 is satisfied), that is, the state of alternating input voltage Vacin falls into the instantaneous interruption state (step S203: Y), print controller 23A then performs the operation control in the instantaneous interruption as in the embodiment (step S103 of FIG. 7). Specifically, print controller 23A performs the control of stopping the operation of DC-AC inverter 262 in low-voltage power supplier 26A (step S203). In this case, a series of control processes illustrated in FIG. 11 is thus completed.

Meanwhile, when print controller 23A determines that alternating input voltage Vacin is not equal to or lower than threshold voltage Vth2 (Vacin≤Vth2 is not satisfied), that is, the state of alternating input voltage Vacin does not fall into the instantaneous interruption state (step S203: N), print controller 23A then determines whether alternating input voltage Vacin is in the instantaneous voltage drop state. Specifically, print controller 23A determines whether alternating input voltage Vacin is equal to or lower than threshold voltage Vth1 (Vacin≤Vth1 (>Vth2) is satisfied) (step S205). When print controller 23A determines that alternating input voltage Vacin is not equal to or lower than threshold voltage Vth1 (Vacin≤Vth1 is also not satisfied), that is, the state of alternating input voltage Vacin also does not fall into the instantaneous voltage drop state (step S205: N), print controller 23A determines that it is normal period ΔT0 and the process returns to first step S201.

Meanwhile, when print controller 23A determines that alternating input voltage Vacin is equal to or lower than threshold voltage Vth1 (Vacin≤Vth1 is satisfied), that is, the state of alternating input voltage Vacin falls into the instantaneous voltage drop state (step S205: Y), print controller 23A then determines whether the load change of power factor correction circuit 261 is small (power factor correction circuit 261 is in a small load state). Specifically, print controller 23A determines whether total output current Ia detected in step S201 is lower than the aforementioned threshold current Ith3a (Ia<Ith3a is satisfied) (step S206). In this case, when print controller 23A determines that total output current Ia is not lower than threshold current Ith3a (Ia<Ith3a is not satisfied), that is, the state of alternating input voltage Vacin falls into the instantaneous voltage drop state but the state of power factor correction circuit 261 does not fall into the small load state (step S206: N), print controller 23A determines that it is normal period ΔT0 and the process returns to first step S201.

Meanwhile, when print controller 23A determines that total output current Ia is lower than threshold current Ith3a (Ia<Ith3a is satisfied), that is, the state of alternating input voltage Vacin falls into the instantaneous voltage drop state and the state of power factor correction circuit 261 falls into the small load state (step S206: Y), print controller 23A then performs an operation control in the instantaneous voltage drop and the small load to be described below (steps S207).

Note that, as described above, threshold current Ith3a in this case is set to be changeable depending on the magnitude of alternating input voltage Vacin. Specifically, for example, when the total value (maximum total value) of the maximum values of the heater currents and the maximum values of the motor currents is 3 A (amperes), threshold current Ith3a is set depending on the magnitude of alternating input voltage Vacin, for example as follows:

90 V<Vacin . . . 3 A×1.00=3.00 A (heater rating 1000 W control),

80 V<Vacin≤90 V . . . 3 A×0.90=2.70 A (upper limit 900 W control),

70 V<Vacin≤80 V . . . 3 A×0.80=2.40 A (upper limit 800 W control),

20 V<Vacin≤70 V . . . 3 A×0.15=0.45 A (upper limit 100 W control).

In step S207, print controller 23A performs the aforementioned operation control of reducing the power consumption by performing the operation control of transitioning to the energy saving mode. In the energy saving mode, print controller 23A performs a control (reduction control) of reducing the voltages (alternating voltages Vac2a and Vac2b) applied to halogen heaters 150a and 150b and the print speed (voltages applied to the various drive mechanisms described in FIG. 2) of image formation apparatus 1. In this case, print controller 23A performs such reduction control based on total power consumption Pa obtained in step S202.

Specifically, for example, when total power consumption Pa is 1000 W and is to be reduced to 900 W, print controller 23A performs the reduction control as follows. Specifically, for example, print controller 23A reduces the voltages applied to halogen heaters 150a and 150b by 10% and reduces the aforementioned motor currents (motor power) by 10% to reduce the print speed by 10% while maintaining a toner charge amount, a heating amount in the fusing operation, and the like per unit area in the conveyed recording medium to maintain print quality.

A series of control processes illustrated in FIG. 11 is thus completed.

As described above, in Modified Example 1, since print controller 23A, voltage detection circuit 265A, and current detection circuit 266A perform the operation control of reducing the power consumption in at least halogen heaters 150a and 150b when the aforementioned predetermined conditions are satisfied, the following is achieved. Specifically, also in Modified Example 1, when alternating input voltage Vacin is in the instantaneous voltage drop state and the load change in power factor correction circuit 261 is small, the power consumption in at least halogen heaters 150a and 150b is reduced. Accordingly, in Modified Example 1, the power consumption of image formation apparatus 1 as a whole can be reduced as in the embodiment.

Moreover, particularly in Modified Example 1, since the aforementioned operation control of reducing the power consumption is performed by utilizing total output current Ia and total power consumption Pa, for example, the following effects can be obtained in comparison to Modified Example 2 to be described later. Specifically, in Modified Example 1, it is possible to perform a rough determination and operation control in consideration of DC-DC converter 263 and achieve simple processing.

Modified Example 2

(Configuration)

Figure 12:
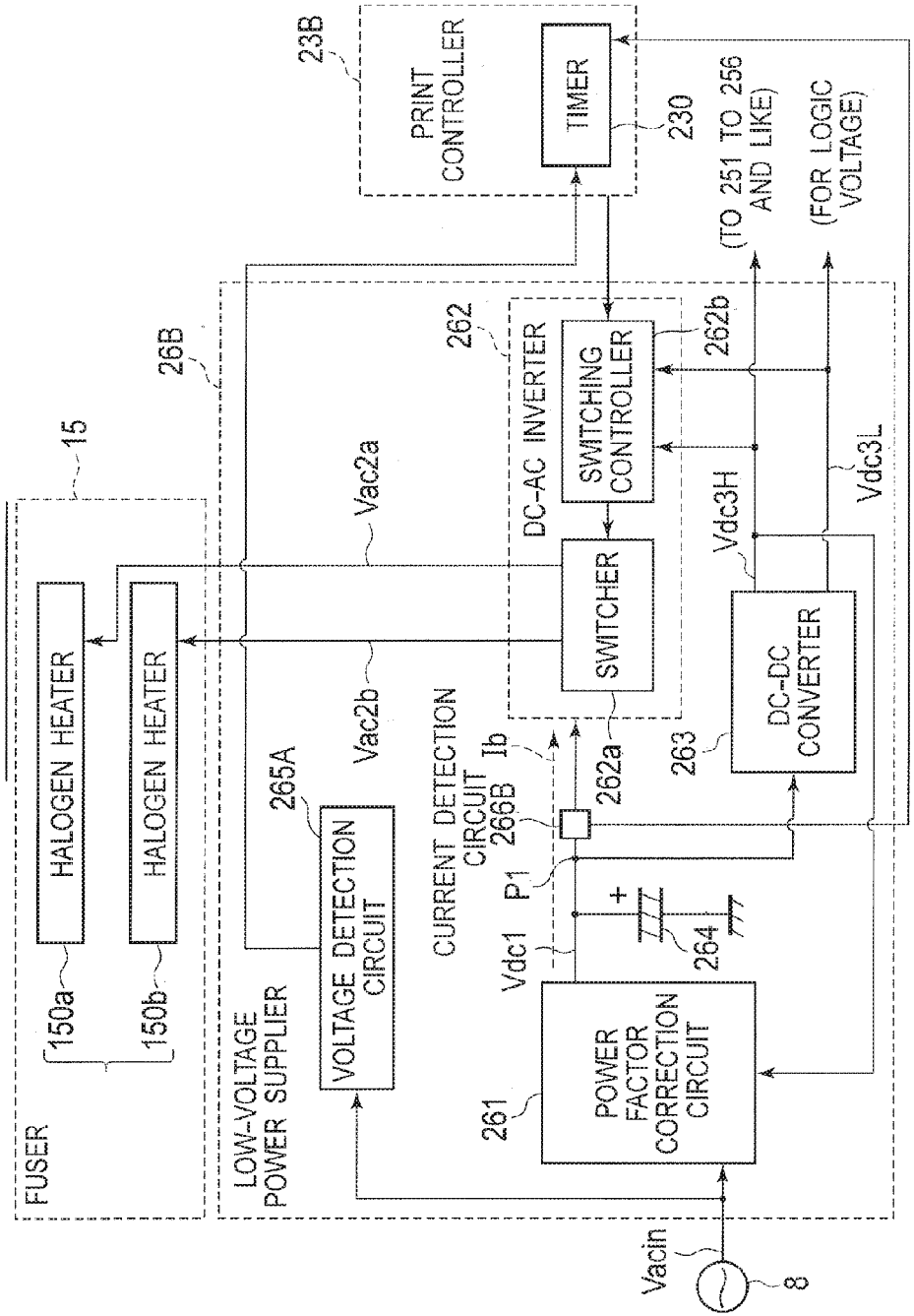
FIG. 12 is a schematic circuit diagram illustrating a configuration example of heaters and a control mechanism thereof in Modified Example 2.

FIG. 12 is a circuit diagram schematically illustrating a detailed configuration example of halogen heaters 150a and 150b and a control mechanism thereof (print controller 23B and low-voltage power supplier 26B) in Modified Example 2. Note that print controller 23B and low-voltage power supplier 26B are a specific example of a "heater control device" in the disclosure.

Low-voltage power supplier 26B corresponds to low-voltage power supplier 26 in the embodiment illustrated in FIG. 3 in which voltage detection circuit 265A and current detection circuit 266B are provided instead of voltage detection circuit 265, and other configurations of low-voltage power supplier 26B are basically the same as the configurations of low-voltage power supplier 26. Note that, since voltage detection circuit 265A is the same as that described in Modified Example 1, any description thereof is omitted.

Current detection circuit 266B is a circuit (current detector) which detects individual output current Ib from time to time, individual output current Ib being a current outputted from power factor correction circuit 261 to DC-AC inverter 262 alone as illustrated in FIG. 12. Current detection circuit 266B is also formed of, for example, a general current detection circuit using a current transformer and the like. Note that individual output current Ib is a specific example representing a "load change (of the first voltage converter)" in the disclosure.

Like print controllers 23 and 23A described above, print controller 23B has a function of performing control, such as an operation control of reducing the power consumption in at least halogen heaters 150a and 150b when predetermined conditions are satisfied. Note that print controller 23B and voltage detection circuit 265A and current detection circuit 266B in low-voltage power supplier 26B are a specific example of a "controller" in the disclosure.

Specifically, print controller 23B first determines whether alternating input voltage Vacin detected by voltage detection circuit 265A has decreased to a range of threshold voltage Vth1 or lower and higher than threshold voltage Vth2 (Vth2<Vacin≤Vth1 is satisfied: instantaneous voltage drop). Then, print controller 23B determines whether individual output current Ib detected by current detection circuit 266B is lower than predetermined threshold current Ith3b to be described later (Ib<Ith3b is satisfied: load change of power factor correction circuit 261 is small).

Then, when the load change of power factor correction circuit 261 is small in the instantaneous voltage drop state described above, print controller 23B performs the aforementioned operation control of reducing the power consumption by performing the operation control of transitioning to an energy saving mode to be described later as in Modified Example 1.

(Operations and Effects)

Next, operations and effects of print controller 23B and low-voltage power supplier 26B in Modified Example 2 are described. Note that, since basic operations are the same as those in the embodiment, any description thereof is omitted as appropriate.

Figure 13:
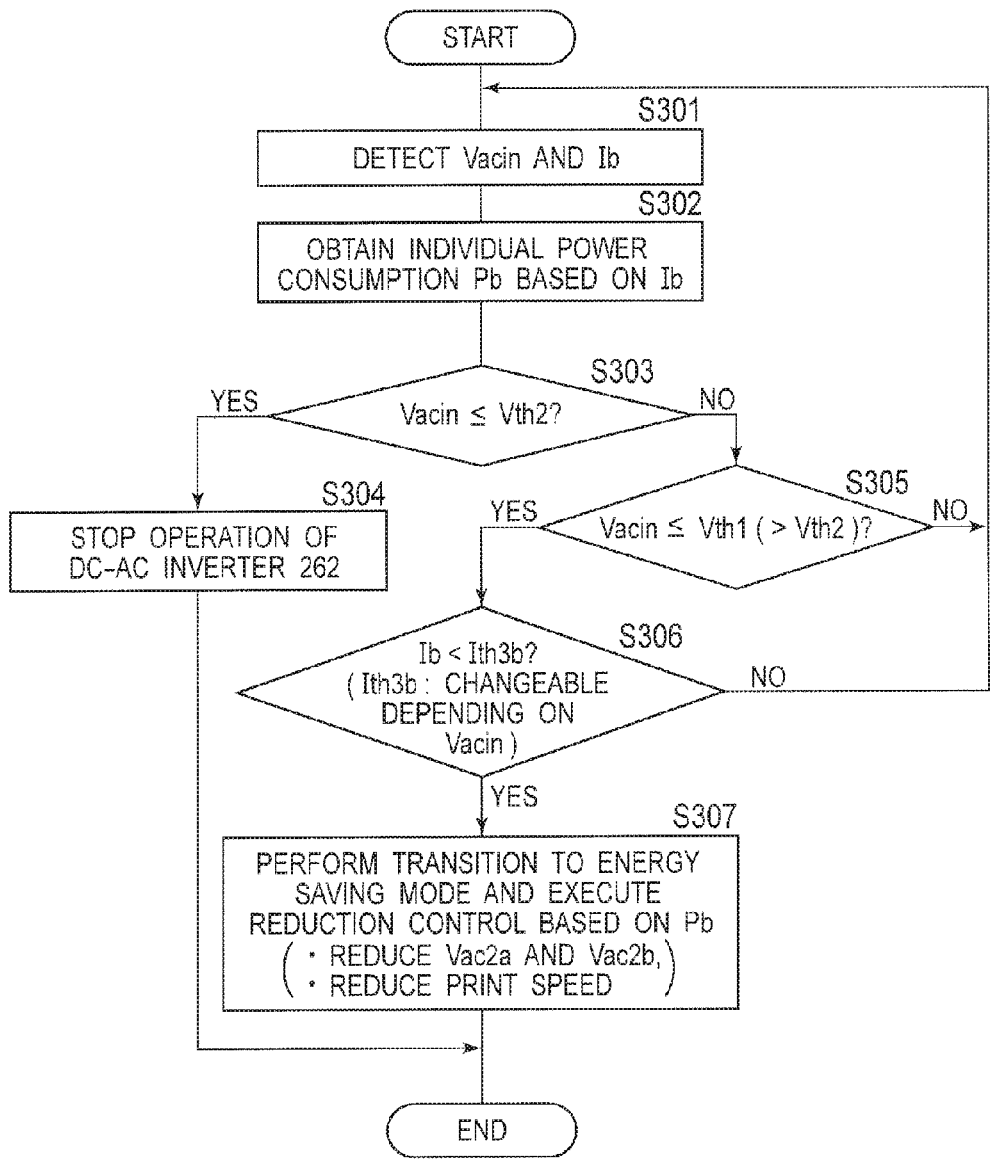
FIG. 13 is a flowchart illustrating an example of a control operation in Modified Example 2.

FIG. 13 is a flowchart illustrating an example of control processes in Modified Example 2 (an operation control of reducing the power consumption which is performed by print controller 23B, voltage detection circuit 265A, and current detection circuit 266B in the instantaneous voltage drop, the instantaneous interruption, and the like).

Note that, in FIG. 13, like threshold current Ith3a in Modified Example 1, threshold current Ith3b is a threshold indicating a boundary between a state where the load change of power factor correction circuit 261 is small (power factor correction circuit 261 is in a small load state) and a state where the load change is not small. Unlike threshold current Ith3a, threshold current Ith3b is determined by using, for example, the heater currents described above. Note that threshold current Ith3b is a specific example of a "third threshold" in the disclosure.

Moreover, like threshold current Ith3a, threshold current Ith3b is set to be changeable depending on the magnitude of alternating input voltage Vacin. Specifically, for example, when the maximum value of the aforementioned heater currents is 2.6 A, threshold current Ith3b is set depending on the magnitude of alternating input voltage Vacin, for example as follows:

> 90 V<Vacin . . . 2.6 A×1.00=2.60 A (heater rating 1000 W control),
>
> 85 V<Vacin≤90 V . . . 2.6 A×0.90=2.34 A (upper limit 900 W control),
>
> 75 V<Vacin≤85 V . . . 2.6 A×0.80=2.08 A (upper limit 800 W control),
>
> 20 V<Vacin≤75 V . . . 2.6 A×0.05=0.13 A (upper limit 100 W control).

Here, since the series of control processes illustrated in FIG. 13 (steps S301 to S307) is basically the same as the series of control processes described in Modified Example 1 (steps S201 to S207 of FIG. 11), detailed description thereof is omitted. Modified Example 2 is different from Modified Example 1 in the following points. Specifically, first, individual output current Ib described above is used in Modified Example 2, instead of the total output current Ia used in Modified Example 1. Moreover, in association with this, individual power consumption Pb, which is the power consumption of DC-AC inverter 262 alone, is used in Modified Example 2, instead of total power consumption Pa (the total value of power consumption in DC-AC inverter 262 and DC-DC converter 263) as used in Modified Example 1. Furthermore, the aforementioned threshold current Ith3b is used in Modified Example 2 instead of the threshold current Ith3a used in Modified Example 1.

Note that, in the energy saving mode (step S307) of Modified Example 2 depicted in FIG. 13, for example, when individual power consumption Pb is 1000 W and is to be reduced to 900 W, print controller 23B performs the reduction control as follows. Specifically, for example, print controller 23B reduces the voltages applied to halogen heaters 150a and 150b by 10% and reduces the print speed by 10% along with the reduction of heat amount in this voltage reduction while maintaining a toner charge amount, a heating amount in the fusing operation, and the like per unit area in the conveyed recording medium to maintain print quality. Note that the aforementioned motor currents (motor power) may be reduced by 10% in accordance with the amount of print speed to be reduced.

As described above, in Modified Example 2, since print controller 23B, voltage detection circuit 265A, and current detection circuit 266B perform the operation control of reducing the power consumption in at least halogen heaters 150a and 150b when the aforementioned predetermined conditions are satisfied, the following is achieved. Specifically, also in Modified Example 2, the power consumption of image formation apparatus 1 as a whole can be reduced as in the embodiment and in Modified Example 1.

Moreover, particularly in Modified Example 2, since the operation control of reducing the power consumption is performed by utilizing individual output current Ib and individual power consumption Pb, for example, the following effects can be obtained in comparison to the aforementioned Modified Example 1. Specifically, since the amount of power consumption in DC-AC inverter 262 is relatively large, in Modified Example 2, it is possible to improve the determination accuracy and perform a more accurate operation control (that is, it is possible to check a fusing performance in detail).

3. Other Modified Examples

Although the invention has been described above by using the embodiment and the modified examples, the invention is not limited to the embodiment and the like, and various changes can be made thereto.

For example, although the aforementioned embodiment and the like are described by using the specific examples of the configurations (shapes, arrangements, numbers, and the like) of the members in the image formation apparatus, the configurations of the members are not limited to those described in the embodiments and the like, and the shapes, arrangements, numbers, and the like may be different from those described above. Moreover, the values, magnitude relationships, and the like of the various parameters described in the aforementioned embodiment and like are not limited to those described in the embodiment and the like. Control may be performed such that the parameters have different values and different magnitude relationships.

Specifically, for example, the aforementioned embodiment and the like are described by using the example in which the heaters are halogen heaters. However, the configuration of the heaters is not limited to this and may be a different configuration. Specifically, for example, the heaters may be heaters with a different configuration such as, for example, ceramic heaters. Moreover, the type and number of heaters are also not limited to those (two types, two heaters) in the examples described in the embodiment and the like. For example, one type of heater or three or more types of heaters different in power consumption may be provided. Moreover, one or three or more heaters may be provided.

Furthermore, the voltage inputted to the low-voltage power supplier from outside is not limited to the alternating input voltage (commercial voltage) supplied from the commercial power supply. For example, a different external voltage (alternating voltage or direct voltage) may be used as the input voltage. Moreover, each of the voltages (direct voltage Vdc1, alternating voltages Vac2a and Vac2b, and direct voltages Vdc3H and Vdc3L) in the low-voltage power supplier is not limited to the type (direct or alternating) described in the embodiment and the like, and may be either of the types.

Moreover, although the embodiment and the like are described by using the specific examples of the control processes in the instantaneous voltage drop, the instantaneous interruption, and the like, the control processes in the invention are not limited to these and other control processes may be performed. Specifically, for example, an operation control of reducing the power consumption may be performed by detecting direct voltage Vdc1 and one of total output current Ia and individual output current Ib as the load change of power factor correction circuit 261 and using the detected voltage and current in combination. In other words, the method of the control processes described in the embodiment and the method of the control processes described in Modified Example 1 or Modified Example 2 may be used in combination.

Furthermore, the circuit configuration of the low-voltage power supplier (configurations of the voltage converter and the like) are not limited to that described in the embodiment and the like, and may be a different circuit configuration.

Moreover, although the embodiment and the like are described by using the example in which multiple image formation units (four image formation units 11C, 11M, 11Y, and 11K) are provided, the invention is not limited to this configuration. Specifically, the number of image formation units which form image layers, a combination of colors of toners used in the image formation units, and the like can be arbitrarily set depending on usage and purpose. Moreover, in some cases, it is possible to provide one image formation unit and form an image layer of a monochrome (single color) image. In other words, the image formation apparatus may function as a monochrome printer.

Furthermore, although the embodiment and the like are described by giving the plain paper sheet as an example of the recording medium, the recording medium is not limited to this and other media can be used. Specifically, for example, the recording medium may be a special paper such as an overhead projector (OHP) sheet, a card, a postcard, a thick paper (for example, a paper with a weighing of 250 g/m$^2$ or higher), an envelope, or a coated paper with a large heat capacity.

Moreover, although the embodiment and the like are described by giving the image formation apparatus which functions as a printer as the specific example of an "image formation apparatus" in the disclosure, the "image formation apparatus" in the disclosure is not limited to this. Specifically, for example, the invention can be applied also to image formation apparatuses which function as a facsimile, a photocopier, a multifunction printer, and the like.

Furthermore, in the embodiment described above, image formation apparatus 1 reduces the power consumption in halogen heaters 150a and 150b when alternating input voltage Vacin decreases and the load change of power factor correction circuit 261 is or becomes small. However, the condition in which the power consumption is reduced is not limited to this condition. For example, image formation apparatus 1 may reduce the power consumption in halogen heaters 150*a* and 150*b* either when alternating input voltage Vacin decreases or when direct voltage Vdc1 decreases.

The invention includes other embodiments in addition to the above-described embodiments without departing from the spirit of the invention. The embodiments are to be considered in all respects as illustrative, and not restrictive. The scope of the invention is indicated by the appended claims rather than by the foregoing description. Hence, all configurations including the meaning and range within equivalent arrangements of the claims are intended to be embraced in the invention.

The invention claimed is:

1. A heater control device comprising:
    a first voltage converter which generates a direct first voltage based on an alternating external input voltage inputted from outside of the first voltage converter;
    a second voltage converter which generates an alternating second voltage based on the first voltage, alternating-current power based on the second voltage being supplied to one or a plurality of heaters in an apparatus;
    a third voltage converter which generates a third voltage based on the first voltage, at least the one or plurality of heaters are driven based on the third voltage; and
    a controller which performs an operation control of reducing power consumption in at least the one or plurality of heaters in at least one of a case where the external input voltage decreases to a range of a first threshold or lower and higher than a second threshold and a case where a load change of the first voltage converter is lower than a third threshold.

2. The heater control device according to claim 1, wherein
    the load change is represented by the first voltage, and
    the operation control is a control of stopping an operation of the second voltage converter.

3. The heater control device according to claim 2, wherein
    a capacitive element is electrically connected to a route between the first voltage converter and a set of the second and third voltage converters, and
    the third voltage converter operates by utilizing a stored charge stored in the capacitive element, after the operation of the second voltage converter is stopped by the operation control.

4. The heater control device according to claim 3, wherein the controller performs a shutdown process of the apparatus based on power supplied from the third voltage converter utilizing the stored charge.

5. The heater control device according to claim 2, wherein the third threshold is an upper limit voltage value at and below which the third voltage converter is allowed to operate.

6. The heater control device according to claim 1, wherein
    the load change is represented by a total output current outputted from the first voltage converter to the second and third voltage converters, and
    the operation control is a reduction control of reducing the second voltage and an operation speed of the apparatus.

7. The heater control device according to claim 6, wherein the controller
    obtains total power consumption in the second and third voltage converters based on the total output current, and
    performs the reduction control based on the total power consumption.

8. The heater control device according to claim 6, wherein the third threshold is changeable depending on a magnitude of the external input voltage.

9. The heater control device according to claim 1, wherein
    the load change is represented by an individual output current outputted from the first voltage converter to the second voltage converter, and
    the operation control is a reduction control of reducing the second voltage and an operation speed of the apparatus.

10. The heater control device according to claim 9, wherein the controller
    obtains individual power consumption in the second voltage converter based on the individual output current, and
    performs the reduction control based on the individual power consumption.

11. The heater control device according to claim 1, wherein the heater is a fuser heater or a dew prevention heater.

12. The heater control device according to claim 1, wherein the third voltage is a direct voltage.

13. An image formation apparatus comprising:
    one or a plurality of image formation units;
    one or a plurality of heaters;
    a first voltage converter which generates a direct first voltage based on an alternating external input voltage inputted from outside of the first voltage converter;
    a second voltage converter which generates an alternating second voltage based on the first voltage, alternating-current power based on the second voltage being supplied to the one or plurality of heaters;
    a third voltage converter which generates a third voltage based on the first voltage, at least the one or plurality of heaters are driven based on the third voltage;
    a controller which performs an operation control of reducing power consumption in at least the one or plurality of heaters in at least one of a case where the external input voltage decreases to a range of a first threshold or lower and higher than a second threshold and a case where a load change of the first voltage converter is lower than a third threshold.

14. The image formation apparatus according to claim 13, wherein
    the load change is represented by the first voltage, and
    the operation control is a control of stopping an operation of the second voltage converter.

15. The image formation apparatus according to claim 14, wherein
    a capacitive element is electrically connected to a route between the first voltage converter and a set of the second and third voltage converters, and
    the third voltage converter operates by utilizing a stored charge stored in the capacitive element, after the operation of the second voltage converter is stopped by the operation control.

16. The image formation apparatus according to claim 15, wherein the controller performs a shutdown process of the apparatus based on power supplied from the third voltage converter utilizing the stored charge.

17. The image formation apparatus according to claim 14, wherein the third threshold is an upper limit voltage value at and below which the third voltage converter is allowed to operate.

18. The image formation apparatus according to claim 13, wherein the load change is represented by a total output current outputted from the first voltage converter to the second and third voltage converters, and the operation control is a reduction control of reducing the second voltage and an operation speed of the apparatus.

19. The image formation apparatus according to claim 13, wherein the load change is represented by an individual output current outputted from the first voltage converter to the second voltage converter, and the operation control is a reduction control of reducing the second voltage and an operation speed of the apparatus.

20. The image formation apparatus according to claim 13, wherein the heater is a fuser heater or a dew prevention heater.

* * * * *